United States Patent [19]
Adachi et al.

[11] Patent Number: 5,631,664
[45] Date of Patent: May 20, 1997

[54] DISPLAY SYSTEM UTILIZING ELECTRON EMISSION BY POLARIZATION REVERSAL OF FERROELECTRIC MATERIAL

[75] Inventors: Hideo Adachi; Takashi Mihara, both of Iruma, Japan

[73] Assignee: Olympus Optical Co., Ltd., Tokyo, Japan

[21] Appl. No.: 404,132

[22] Filed: Mar. 14, 1995

Related U.S. Application Data

[63] Continuation of Ser. No. 121,501, Sep. 13, 1993, abandoned.

[30] Foreign Application Priority Data

| Sep. 18, 1992 | [JP] | Japan | 4-250151 |
| Mar. 26, 1993 | [JP] | Japan | 5-068892 |
| Mar. 26, 1993 | [JP] | Japan | 5-068893 |
| Mar. 26, 1993 | [JP] | Japan | 5-068894 |
| Jul. 29, 1993 | [JP] | Japan | 5-188383 |

[51] Int. Cl.$^6$ ................................... G09G 3/30
[52] U.S. Cl. ................. 345/74; 345/79; 315/169.3
[58] Field of Search .................. 313/459, 509, 313/495; 315/169.3; 345/74, 75, 76, 79, 80, 97, 207

[56] References Cited

U.S. PATENT DOCUMENTS

| 4,801,994 | 1/1989 | Van Gorkom et al. | 313/499 |
| 4,937,647 | 6/1990 | Sutton | 315/169.3 |
| 5,049,461 | 9/1991 | Arnett et al. | 430/5 |
| 5,151,632 | 9/1992 | Troxell | 345/75 |
| 5,210,462 | 5/1993 | Konishi | 313/495 |
| 5,256,888 | 10/1993 | Kane | 313/499 |

FOREIGN PATENT DOCUMENTS 57-134979  8/1982  Japan .

OTHER PUBLICATIONS

J. Asano; "Field–Excited Emission from Ferroelectric Ceramic in Vacuum"; Sep. 1992; pp. 3098–3101; JPN. J. Appl. Phys. vol. 31.

J. Patel; "Ferroelectrics: Ready for Prime Time?"; pp. 14–16; Information Display Oct. 1992.

"Thermodynamic Stability of Thin Ferroelectric Films" by I.P. Batra and B. D. Silverman, Solid State Communications, vol. 11, pp. 291–294, 1972.

"Phase Transition; Stability, and Depolarization Field in Ferroelectric Thin Films" by I. P. Batra et al. Physical Review B. vol. 8, No. 7 Oct. 1973 pp. 3257–3265.

"Electric Conduction Characteristics of Sel–Gel Ferroelectric Pb $(Zr_{0.4}Ti_{0.6})O_2$ Thin–Film Capacitors Part II" by Takashi Mihara et al. Japan J. Appl. Phys. vol. 34 1995, pp. 5574–5652.

"Characteristics of Bismuth Layered $SrBi_2Ta_2O_3$ Thin–Film Capacitors and Comparison with $Pb(Zr, Ti)O_3$" by Takashi Mihara et al. Japan J. Appl. Phys. vol. 34 (1995) pp. 5233–5239.

*Primary Examiner*—Richard Hjerpe
*Assistant Examiner*—Lun-Yi Lao
*Attorney, Agent, or Firm*—Frishauf, Holtz, Goodman, Langer & Chick

[57] ABSTRACT

A plurality of electrical light-emitting surface light source elements are arranged in a matrix form on a semiconductor substrate. Each of the surface light source elements has a ferroelectric capacitor portion and an electrical light-emitting portion. The capacitor portion has a lower electrode formed on the substrate, a ferroelectric thin film formed on the lower electrode, and an upper electrode formed on the thin film with an electron emission hole. The light-emitting portion has a carrier acceleration/multiplication layer formed on the upper electrode by a semiconductor layer, a light-emitting layer formed on the acceleration/multiplication layer, and a transparent electrode formed on the light-emitting layer. A plurality of switching elements are formed on the substrate in correspondence with the surface light source elements. A voltage applied across the upper and lower electrodes of the capacitor portion of a corresponding one of the surface light source elements according to a drive signal selectively supplied to the switching elements is inverted. Electrons emitted from the electron emission hole by polarization reversal generated in the thin film are injected in the light-emitting portion through the acceleration/multiplication layer to cause the light-emitting portion to selectively emit light, thereby obtaining visible light through the transparent electrode.

22 Claims, 27 Drawing Sheets

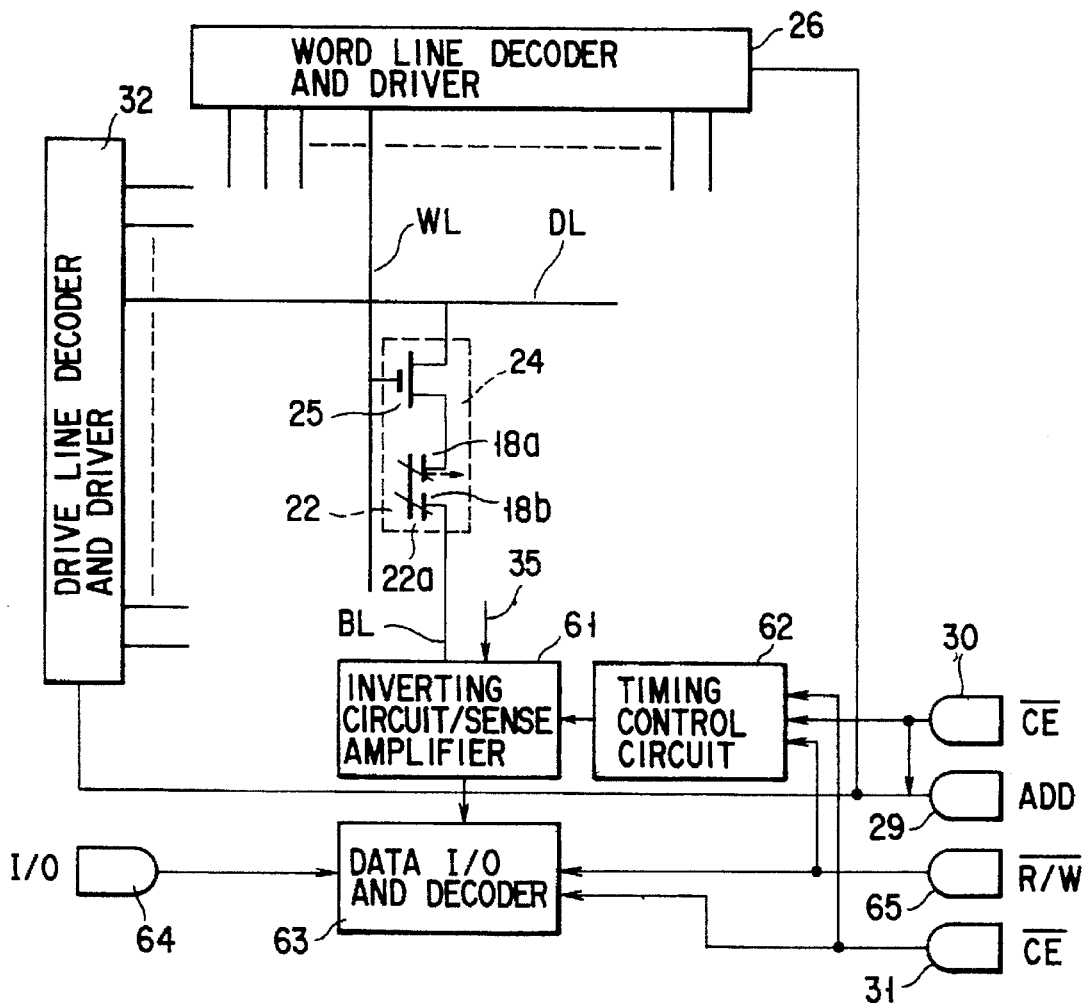
F I G. 13
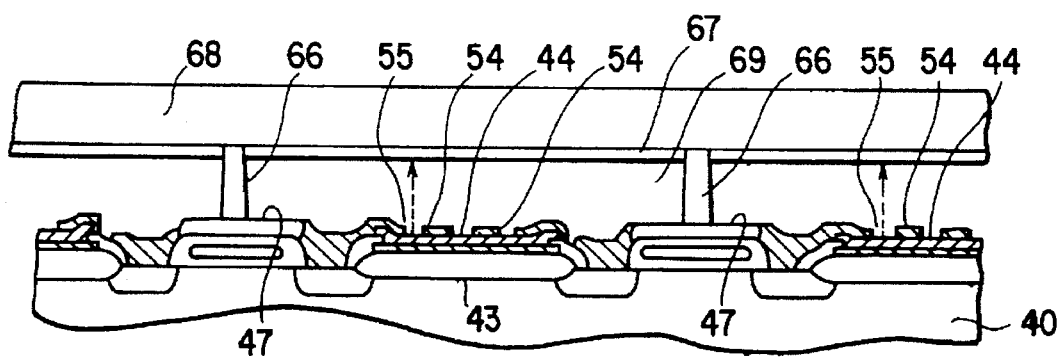
F I G. 14

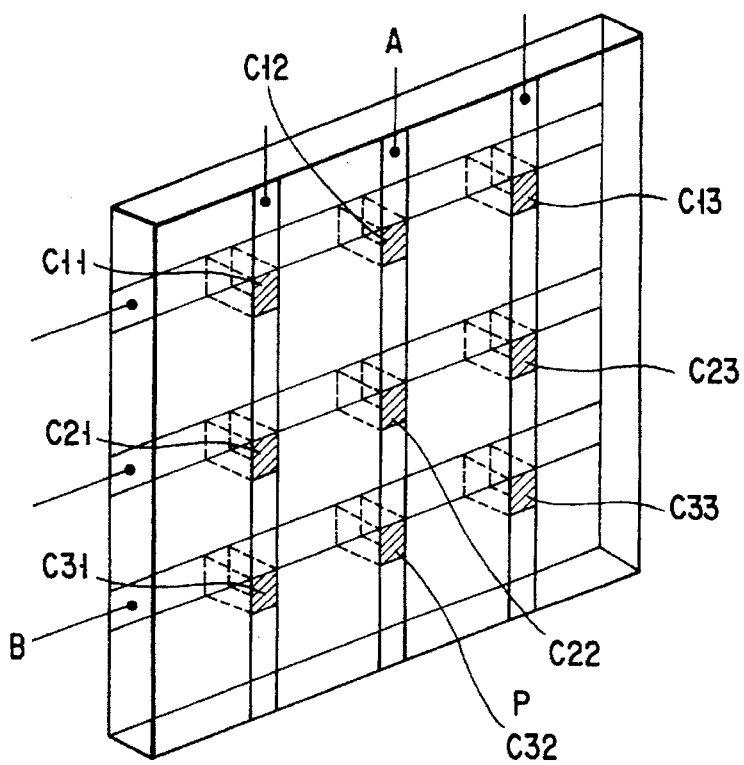
FIG. 16A
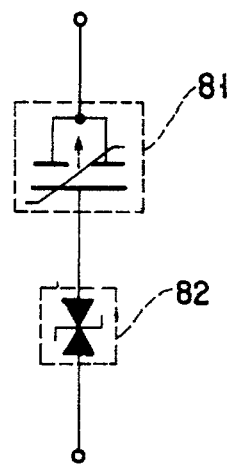
FIG. 17
| | DIVIDED VOLTAGE | |
|---|---|---|
| | 3 x 3 | n x n |
| C32 | Vapp | Vapp |
| C12, C22<br>C31, C33 | $\frac{2}{5}$Vapp | $\frac{n-1}{2n-1}$Vapp |
| C11, C13<br>C21, C23 | $\frac{1}{5}$Vapp | $\frac{1}{2n-1}$Vapp |
FIG. 16B
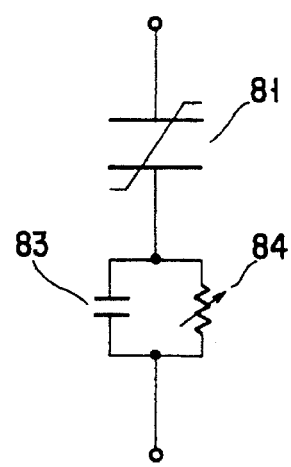
FIG. 18

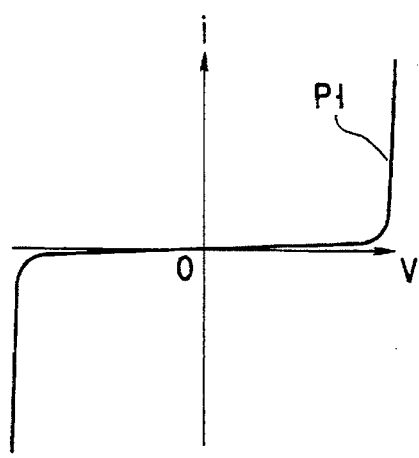
F I G. 19 A
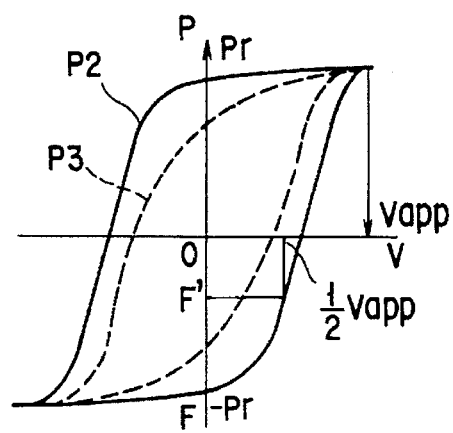
F I G. 19 B
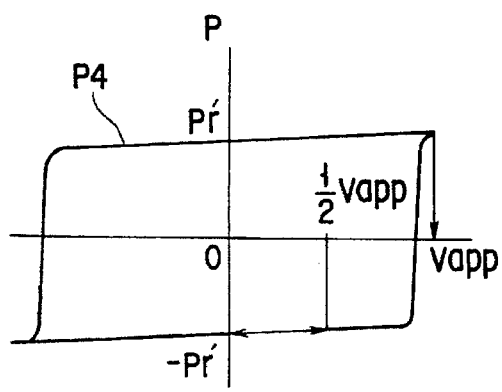
F I G. 19 C
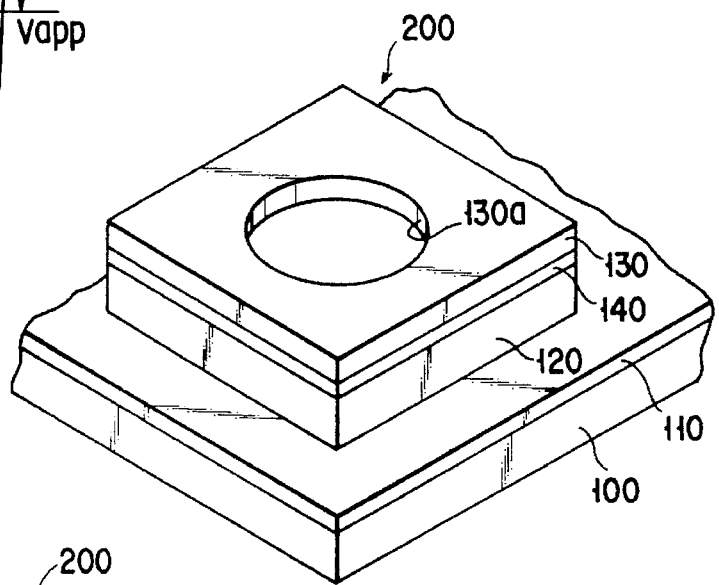
F I G. 20 A
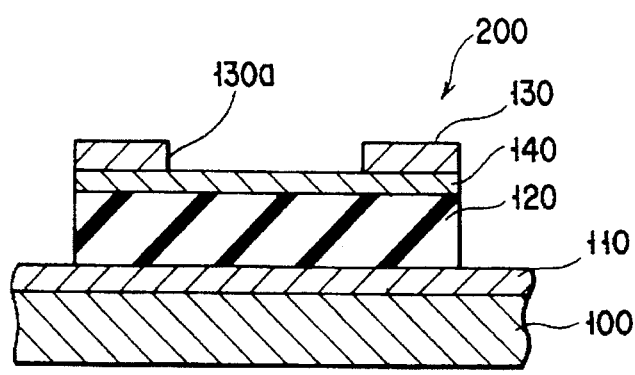
F I G. 20 B

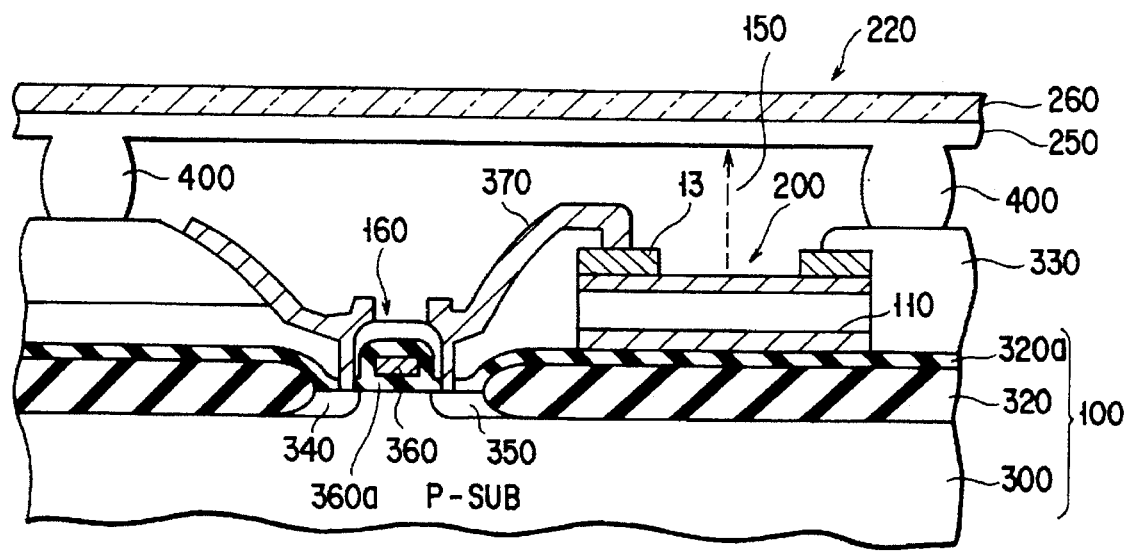
F I G. 22A
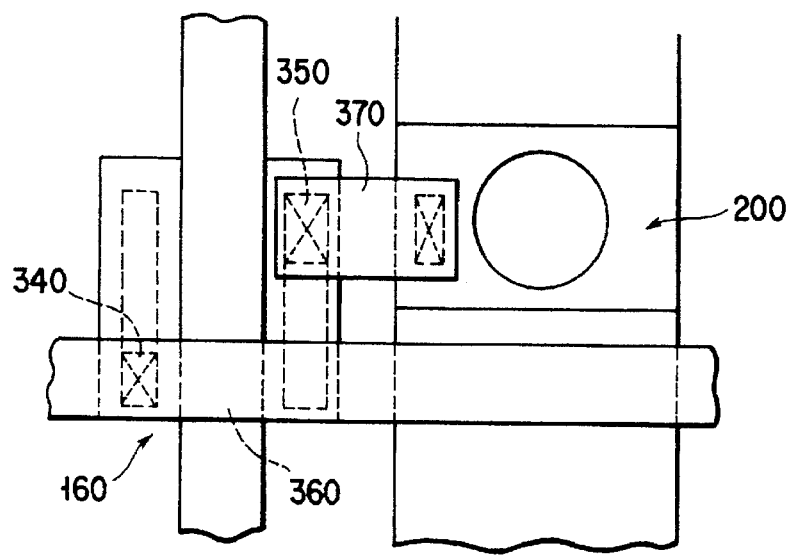
F I G. 22B

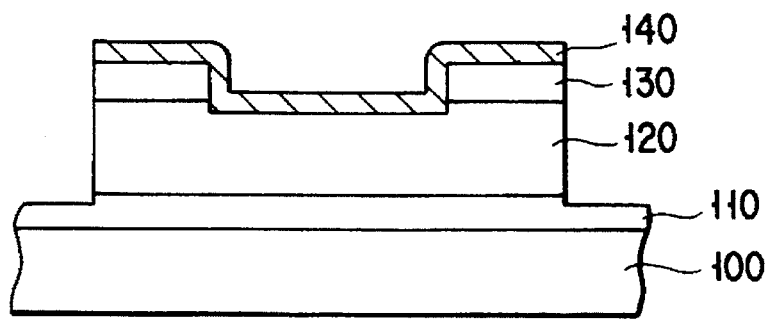
F I G. 26
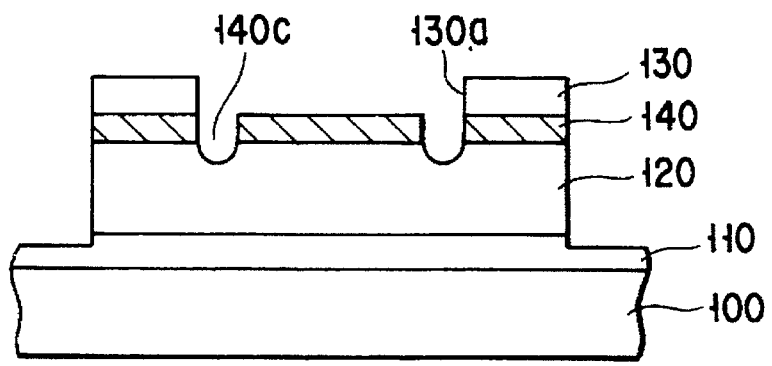
F I G. 27
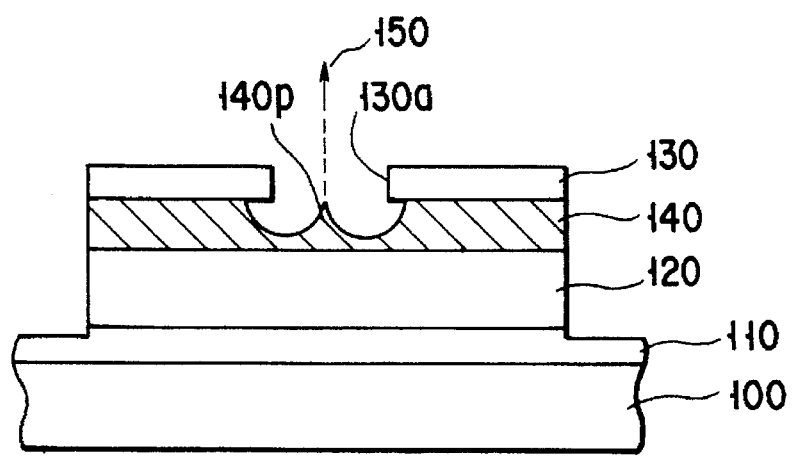
F I G. 28

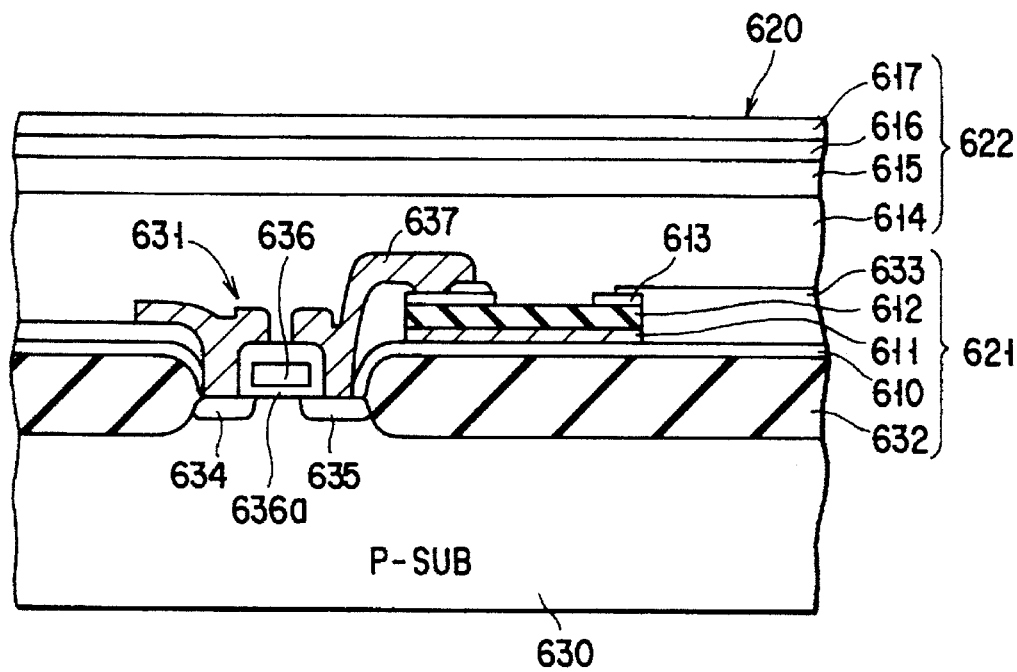
F I G. 36A
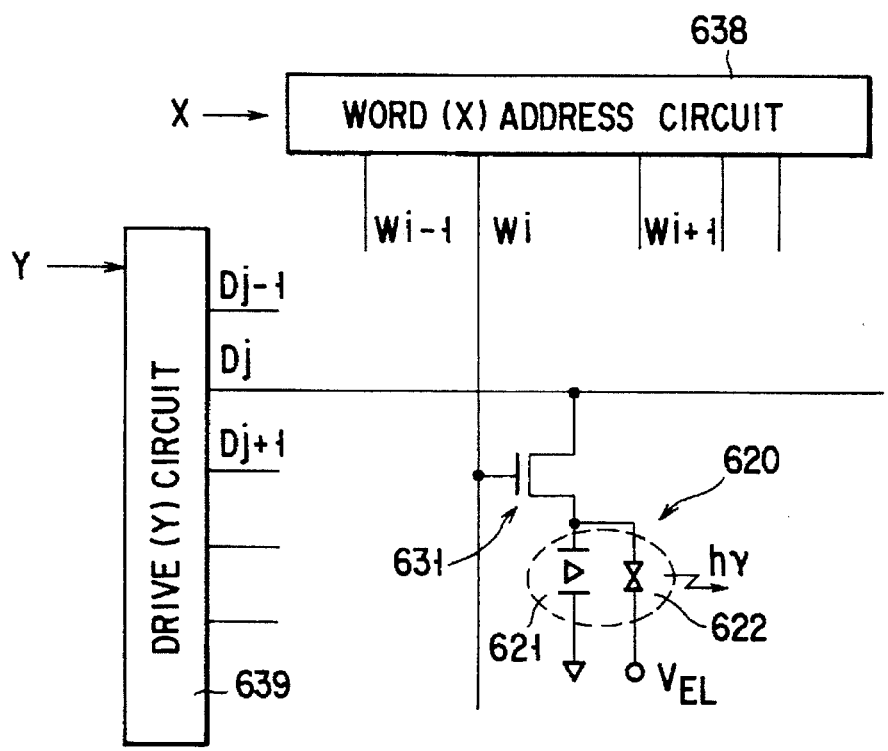
F I G. 36B

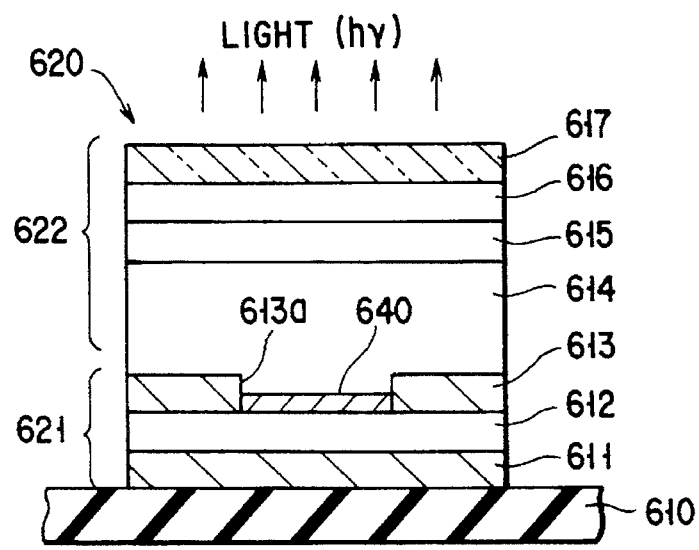
F I G. 39A
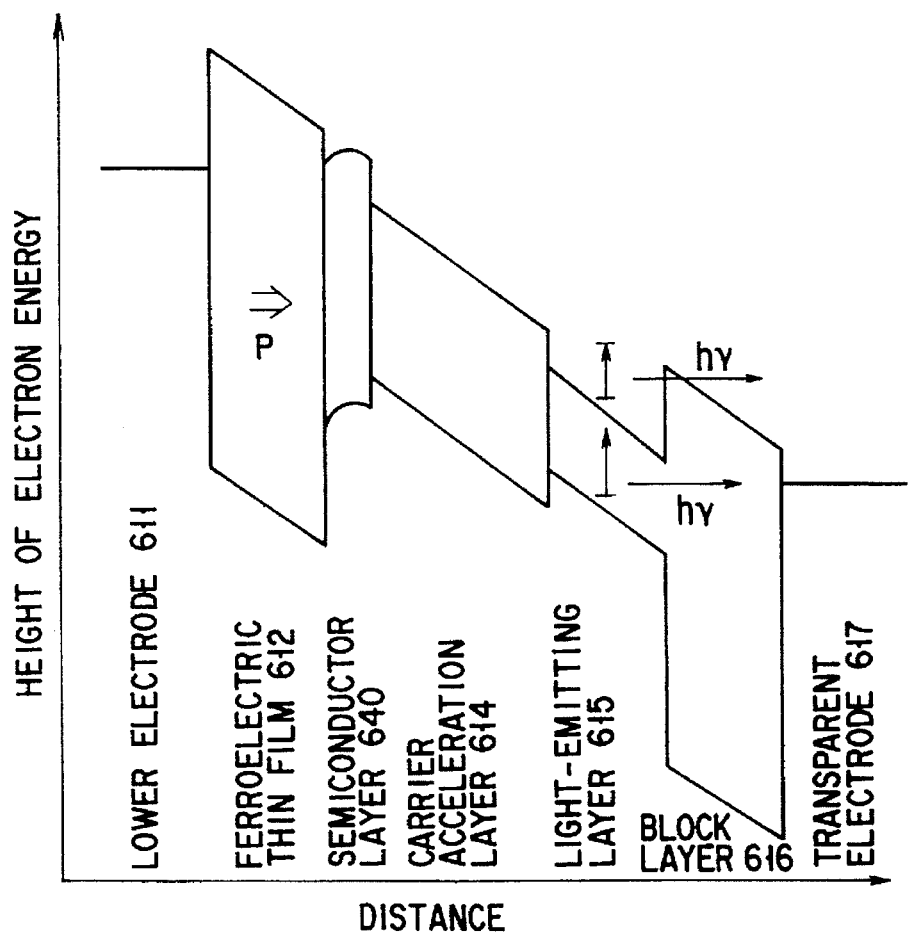
F I G. 39B

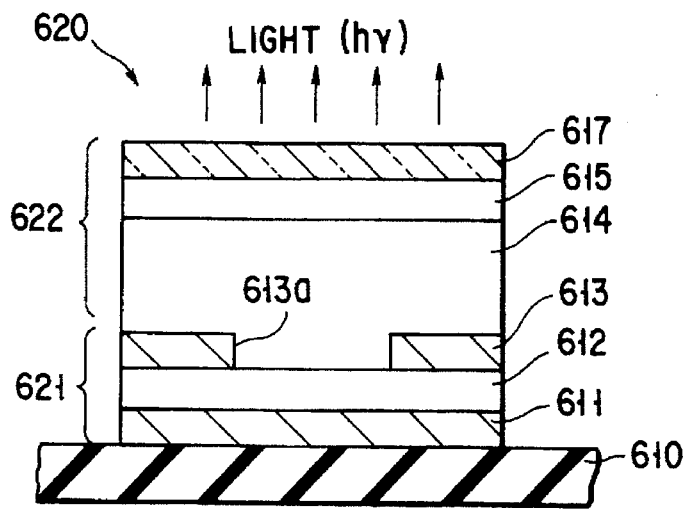
F I G. 40A
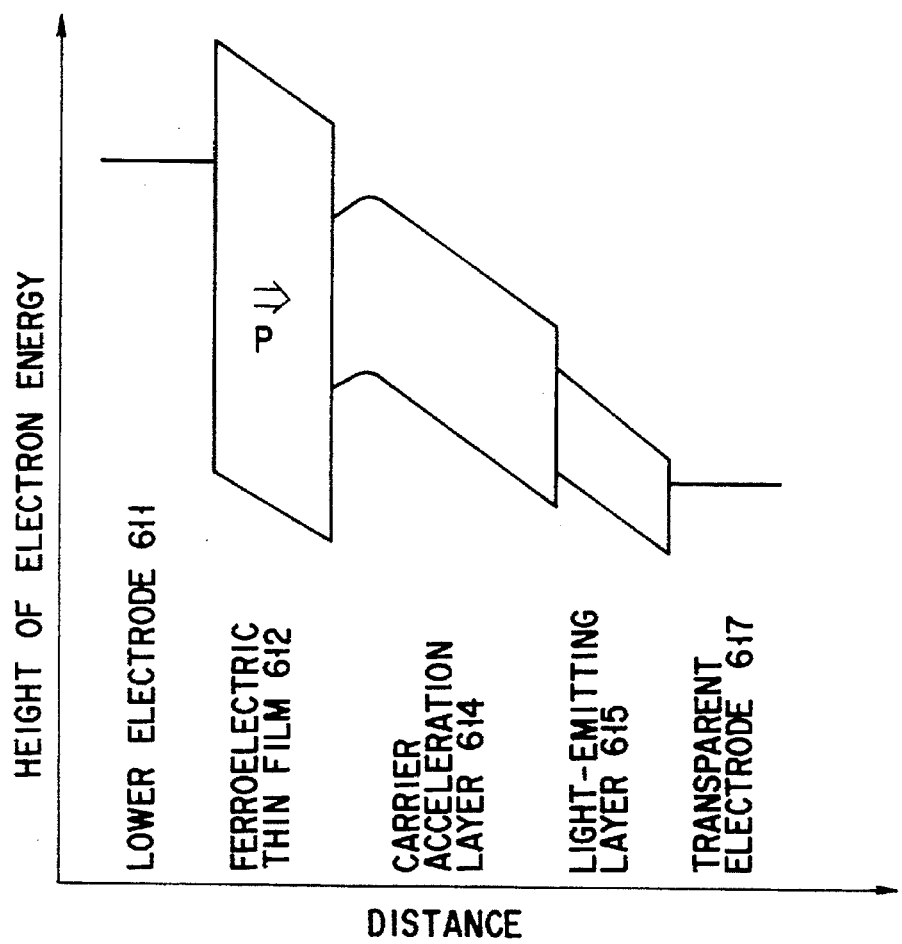
F I G. 40B

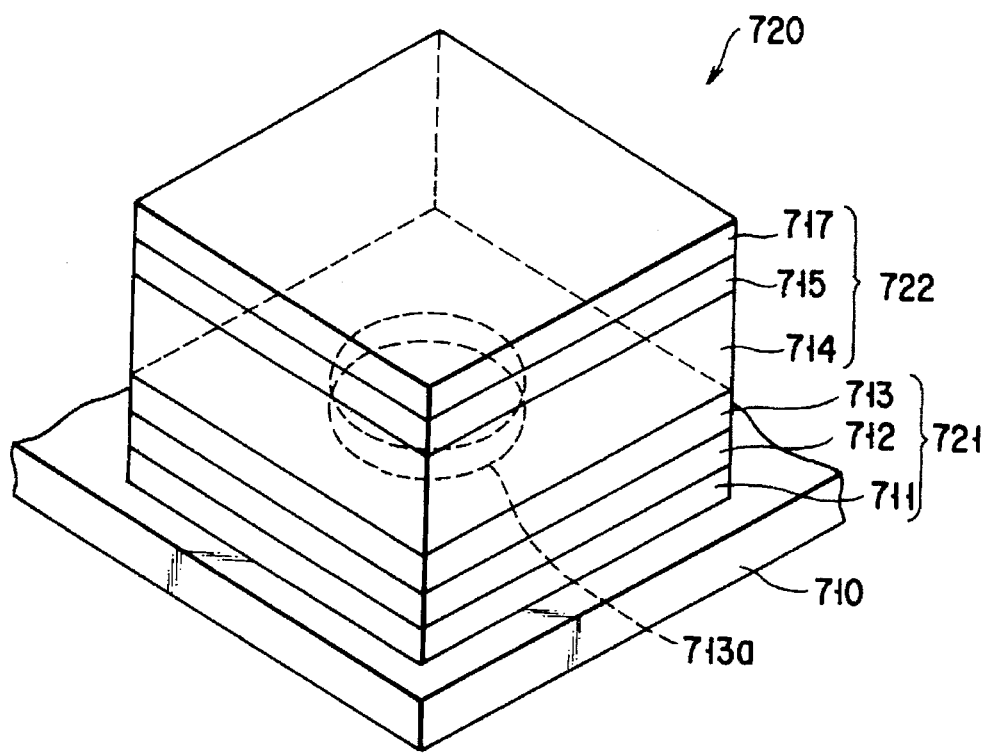
F I G. 42
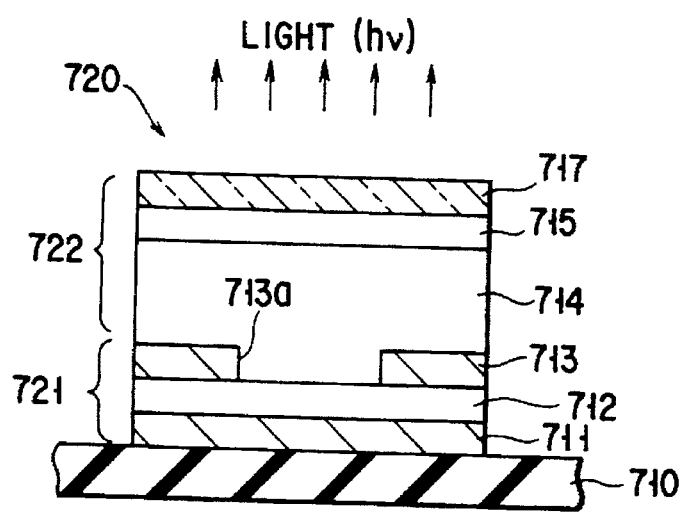
F I G. 43A

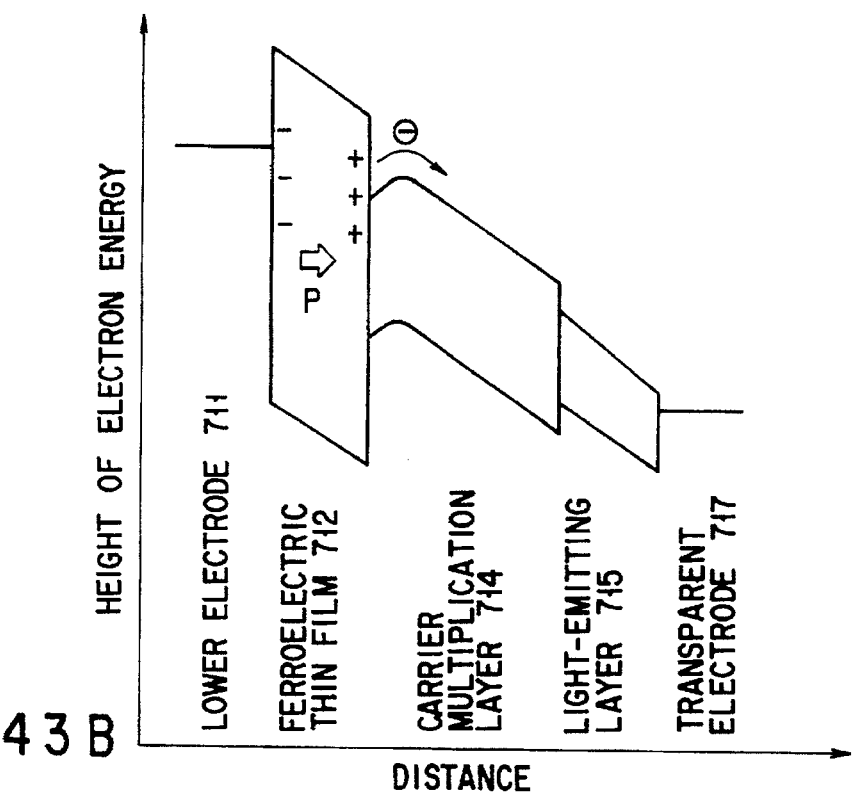
F I G. 43B
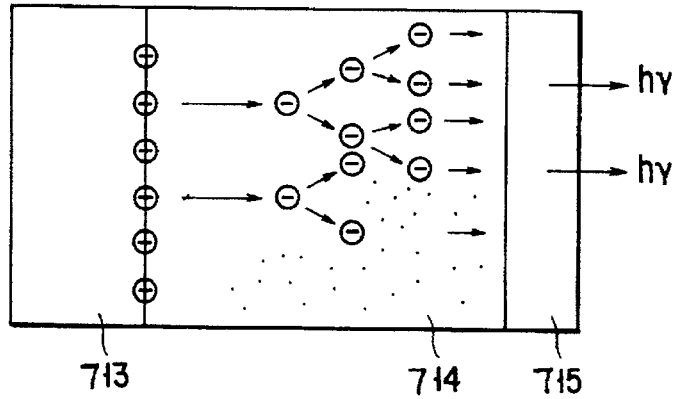
F I G. 44A
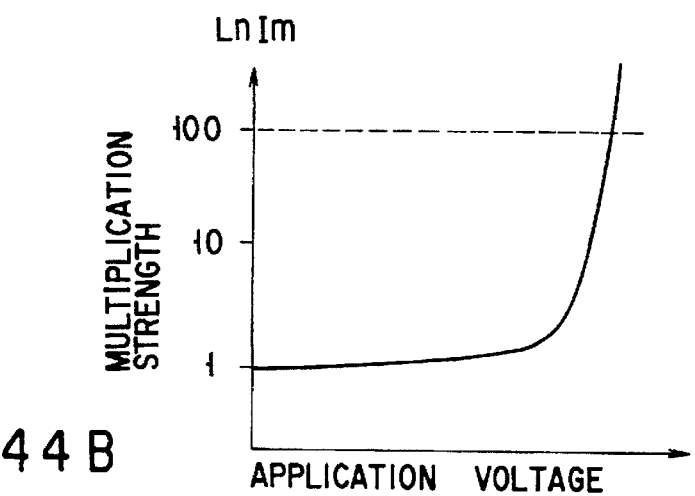
F I G. 44B

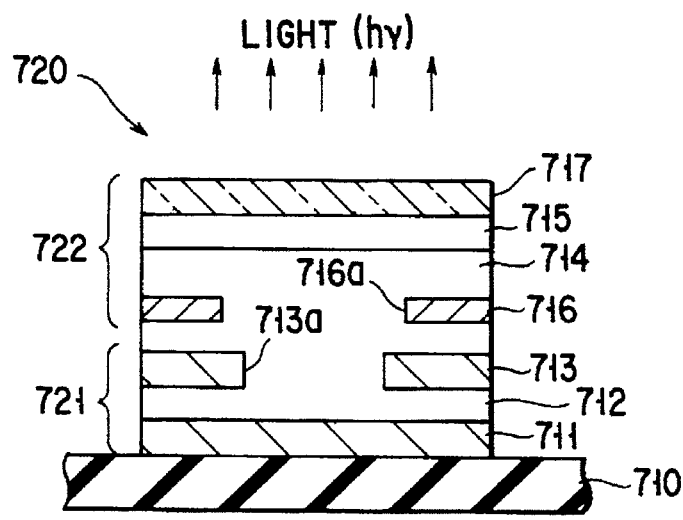
F I G. 45A
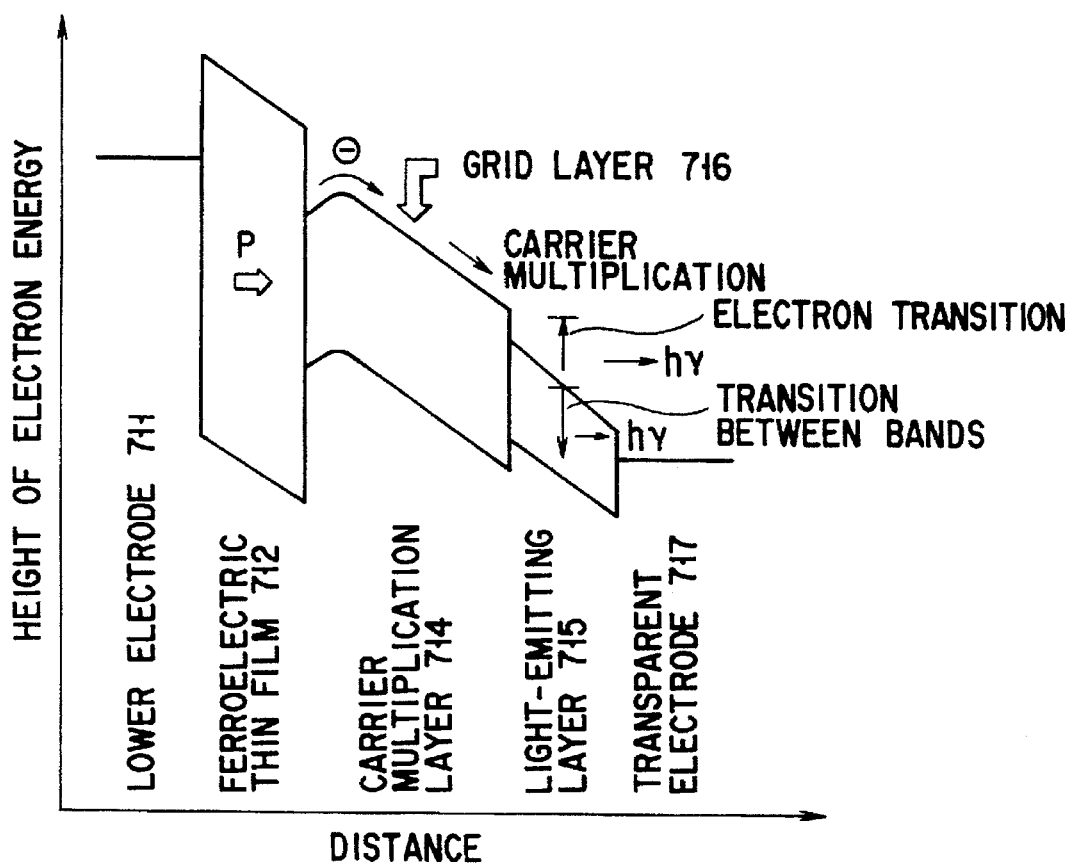
F I G. 45B

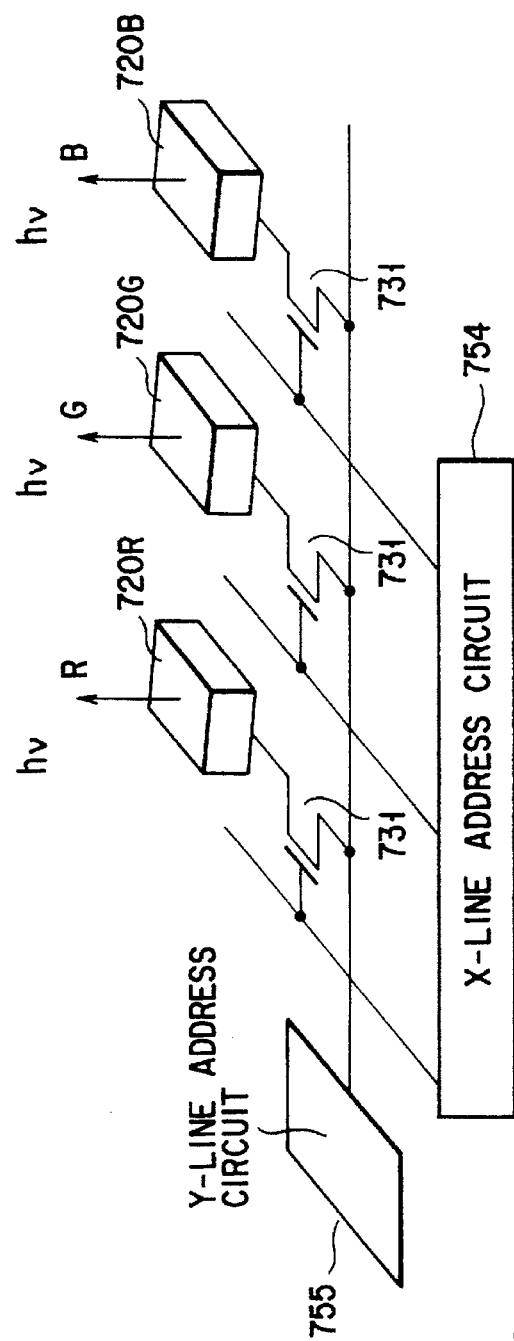
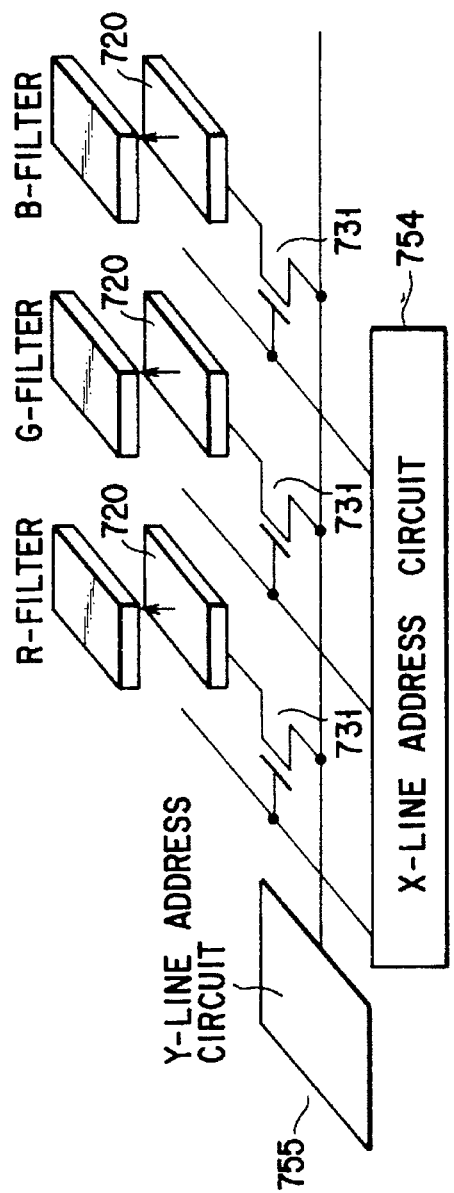
FIG. 48A
FIG. 48B

DISPLAY SYSTEM UTILIZING ELECTRON EMISSION BY POLARIZATION REVERSAL OF FERROELECTRIC MATERIAL

This application is a Continuation of application Ser. No. 08/121,501, filed Sep. 13, 1993, now abandoned.

BACKGROUND OF THE INVENTION

1. Field of the Invention

The present invention generally relates to a display system and, more particularly, to an image display apparatus such as a flat-type display utilizing electron emission by polarization reversal of a ferroelectric material.

2. Description of the Related Art

In recent years, due to the great needs to notebook type personal computers, portable game machines, and the like, the production and sales of image display elements are increased. More specifically, liquid crystal display elements are more popularly used than other solid image display elements because of the low power consumption of the liquid crystal display elements.

The liquid crystal displays are roughly classified into simple matrix liquid crystal displays and active matrix liquid crystal displays. Although the simple matrix liquid crystal displays are advantageously used for high-density integration because of their simple structures, the simple matrix liquid crystal display elements have crosstalk to a non-selected cell, and an increase in resolution which is an object of the high-density integration cannot be achieved. In contrast to this, in the active matrix liquid crystal displays, crosstalk to a non-selected cell can be suppressed without posing any problem, and an image having a high resolution can be obtained, thereby considerably improving image quality. In this manner, a large number of active matrix liquid crystal displays have been used in recent years.

However, in these liquid crystal displays, the following problems are posed. First, the liquid crystal displays are not self-emission type displays. For this reason, although the liquid crystal display elements are improved using back light electric luminescence (EL) or a back light fluorescent tube, the service life and power consumption of the back light electric luminescence and back light fluorescent tube pose a problem. In addition, a liquid crystal display has a field angle narrower than that of each of other display devices, i.e., about 30°, and has poor time response.

In addition, especially, an active matrix liquid crystal display is manufactured in complex manufacturing steps, and the production cost of the active matrix liquid crystal display is high.

The liquid crystal displays having the above drawbacks are not satisfactorily used in image display apparatuses which are popularly used in the field of information industries, and image displays free from the above drawbacks are required. Although an image display apparatus using a cathode-ray tube is excellent in a field angle, time response, and a resolution, the image display apparatus is a vacuum tube apparatus and has poor portability and high power consumption.

As described above, although a conventional image display element has been improved, there is no image display apparatus which can simultaneously satisfy a high image resolution, excellent time response, a wide field angle, a self-emission property, low power consumption, and low cost. The image display apparatus which satisfies the above conditions is demanded.

On the other hand, an EL element is developed, as a self-emission type of light-emitting device which satisfies the low power consumption.

In this EL element, a thin film is inserted between an phosphor (light-emitting) film and a thick insulating film on the phosphor (light-emitting) film side, and an intermediate electrode is inserted between the light-emitting film and the thick insulating film on the thick insulating film side. Note that a transparent electrode consisting of a metal such as Al or Au or ITO (Indium Tin Oxide) may be used as the intermediate electrode, or the intermediate electrode may consist of an n-type semiconductor in which a donor is very heavily doped. However, when the metal or semiconductor is used, the intermediate electrode from which light is extracted must have a small thickness enough to transmit the light.

In this structure, when a voltage is applied across a back electrode and the transparent electrode, and an electric field is applied to the phosphor (light-emitting) film, electrons from the intermediate electrode tunnel through the thin insulating film to be injected in the phosphor (light-emitting) film. The injected electrons are accelerated by the electric field generated in the phosphor (light-emitting) film and collide with a luminescent center in the phosphor (light-emitting) film so as to excite the luminescent center.

When the intermediate electrode is not formed, electrons injected in the phosphor (light-emitting) film are supplied from a level (trap) located at the interface between the insulating film and the phosphor (light-emitting) film. Therefore, in the same electric field, the number of injected electrons is larger when the intermediate electrode is formed than when the intermediate electrode is not formed, and light emission luminance is increased.

In the general EL element as discribed above, carriers are supplied by forming a trap site or a space charge region in a high electric field. However, in order to obtain carriers in only this electric field, an electric field of several MV/cm must be applied to extract the carriers by a tunnel phenomenon, or hot carriers must be generated. In this manner, it is conventionally very difficult to extract carriers by the tunnel phenomenon or by the generation of hot carriers. In addition, since a drive voltage is very high, i.e., about 100 V, the EL element is not practically used in place of a liquid crystal display element.

SUMMARY OF THE INVENTION

It is, therefore, an object of the present invention to provide a display system utilizing electron emission by polarization reversal of a ferroelectric material which can eliminate drawbacks of the conventional display system.

The present invention has been made in consideration of the above problems, and has as its object to provide an image display apparatus, using an electron beam generating apparatus utilizing polarization reversal of an ferroelectric material, which can simultaneously satisfy a high image resolution, excellent time response, a wide field angle, a self-emission property, low power consumption, and low cost.

It is another object of the present invention to provided an electron beam generating apparatus, utilizing polarization reversal of a ferroelectric material, which can constitute a display which has low power consumption, does not require an auxiliary light source such as a back light, has a wide field angle and excellent time response when the display is applied to an image display apparatus, can reduce production cost, and has a high image resolution.

It is still another object of the present invention to provide an electrical light-emitting surface light source element, utilizing electron emission by polarization reversal of a ferroelectric material, which does not require an auxiliary light source such as a back light, has excellent time response, and can be driven by a low voltage.

According to one aspect of the present invention, there is provided an image display apparatus comprising: a semiconductor substrate; a plurality of electrical light-emitting surface light source elements arranged in a matrix form on the semiconductor substrate, the plurality of electrical light-emitting surface light source elements each having a ferroelectric capacitor portion and an electrical light-emitting portion, the ferroelectric capacitor portion having a lower electrode formed on the semiconductor substrate, a ferroelectric thin film formed on the lower electrode, and an upper electrode formed on the ferroelectric thin film with an electron emission hole, and the electrical light-emitting portion having a carrier acceleration/multiplication layer formed on the upper electrode by a semiconductor layer, a light-emitting layer formed on the carrier acceleration/multiplication layer, and a transparent electrode formed on the light-emitting layer; and a plurality of switching elements formed on the semiconductor substrate in correspondence with the plurality of electrical light-emitting surface light source elements; wherein a voltage applied across the upper and lower electrodes of the ferroelectric capacitor portion of a corresponding one of the plurality of electrical light-emitting surface light source elements in accordance with a drive signal selectively supplied to the plurality of switching elements is inverted, so that electrons emitted from the electron emission hole of the upper electrode by polarization reversal generated in the ferroelectric thin film are injected in the light-emitting portion through the carrier acceleration/multiplication layer of the electrical light-emitting portion to cause the light-emitting portion to selectively emit light, thereby guiding visible light to an outside of the image display apparatus through the transparent electrode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 13 is a view showing the circuit arrangement of an image storage type electron beam generating apparatus according to the second embodiment of the present invention;

FIG. 14 is a sectional view showing the structure of an electron beam generating apparatus having a screen coated with a phosphor and a vacuum state;

FIGS. 16A and 16B are a view and a table for explaining a reason for the structure of the electron beam generating apparatus in FIGS. 15A to 15C;

FIG. 17 is an equivalent circuit diagram of the electron beam generating apparatus shown in FIGS. 15A, 15B, and 15C;

FIG. 18 is another equivalent circuit diagram of the electron beam generating apparatus shown in FIGS. 15A, 15B, and 15C;

FIGS. 19A, 19B, and 19C are graphs showing the characteristics of the electron beam generating apparatus in FIGS. 15A, 15B, and 15C;

FIGS. 20A and 20B are perspective and sectional views showing an electron beam generating apparatus according to the fourth embodiment of the present invention, respectively;

FIGS. 22A and 22B are views showing a display device constituted by integrating the electron beam generating apparatus in FIGS. 20A and 20B together with a MOS transistor, in which FIG. 22A is a sectional view showing a part of the display device and FIG. 22B is a view showing an electrical connection relationship;

FIG. 26 is a sectional view showing an electron beam generating apparatus according to the eighth embodiment of the present invention;

FIG. 27 is a sectional view showing an electron beam generating apparatus according to the ninth embodiment of the present invention;

FIG. 28 is a sectional view showing an electron beam generating apparatus according to the tenth embodiment of the present invention;

FIGS. 30A and 30B are views showing a display constituted by integrating an electron beam generating apparatus according to twelfth embodiment of the present invention together with a MOS transistor, in which FIG. 30A is a sectional view showing a part of the display and FIG. 30B is a view showing an electrical connection relationship;

FIGS. 35A and 35B are diagrams showing electron energy for explaining the light-emitting mechanism of the electrical light-emitting surface light source element of the present invention, in which FIG. 35A shows a state before an application voltage is inverted and FIG. 35B shows a state after the application voltage is inverted;

FIGS. 36A and 36B show a display obtained by combining an electrical light-emitting surface light source element of the fourteenth embodiment of the present invention with a MOS transistor, in which FIG. 36A is a sectional view showing a part of the structure of the display and FIG. 36B is an equivalent circuit diagram of the display;

FIGS. 37A and 37B show the light-emitting system of the display shown in FIGS. 36A and 36B, in which FIG. 37A shows single light emission and FIG. 37B shows multiple light emission;

FIG. 39A is a sectional view showing an electrical light-emitting surface light source element according to another modification of the present invention;

FIG. 39B is a diagram showing electron energy of each layer of the element in FIG. 39A;

FIG. 40A is a sectional view showing an electrical light-emitting surface light source element according to still another modification of the present invention;

FIG. 40B is a diagram showing electron energy of each layer of the element in FIG. 40A;

FIG. 42 is a perspective view showing an electrical light-emitting surface light source element according to the fifteenth embodiment of the present invention;

FIG. 43A is a sectional view showing the element shown in FIG. 42;

FIG. 43B is a diagram showing electron energy of each layer of the element shown in FIG. 42;

FIGS. 44A and 44B are views for explaining the light-emitting mechanism of the electrical light-emitting surface light source element of the present invention, in which FIG. 44A is a view showing a state wherein electrons are multiplied in a multiplication layer to cause light to emit and FIG. 44B is a diagram showing a relationship between an application voltage and a current;

FIG. 45A is a sectional view showing an electrical light-emitting surface light source element according to the sixteenth embodiment of the present invention;

FIG. 45B are a diagram showing electron energy of each layer of the element shown in FIG. 45A;

FIGS. 48A and 48B are schematic views for explaining different arrangements of a color display obtained by combining the electrical light-emitting surface light source element with a MOS transistor;

FIGS. 49A, 49B, and 49C are views for explaining modifications of a capacitor portion, respectively; and FIGS. 50A and 50B are views for explaining modifications of a light-emitting portion, respectively.

DETAILED DESCRIPTION OF THE PREFERRED EMBODIMENTS

Figure 1:
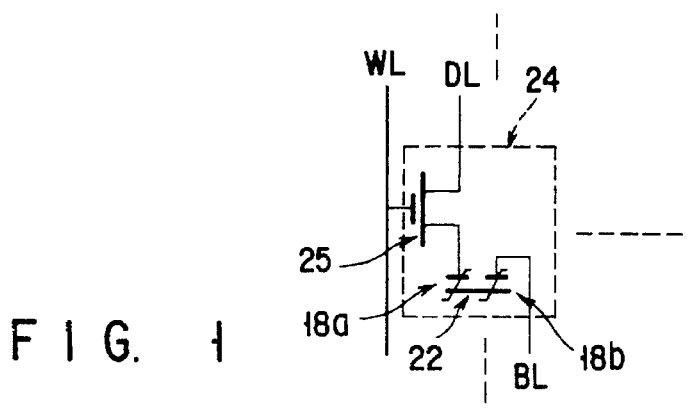
FIG. 1 is a view showing the arrangement of an electron beam generating apparatus according to the present invention.

Reference will now be made in detail to the presently preferred embodiments of the invention as illustrated in the accompanying drawings, in which like reference characters designate like or corresponding parts throughout the several drawings.

Embodiments of the present invention will be described below with reference to the accompanying drawings.

First, an electron beam generating element using a new principle which is the basis of the present invention will be described below.

A study on electron beam emission caused by polarization reversal of a ferroelectric material is reported in Asano et al.:

Jpn. J. Appl. Phys. Vol. 3 (1992) pp. 3098-3101, Part 1, No. 9B September 1992. The gist of this study is as follows.

Figure 4:
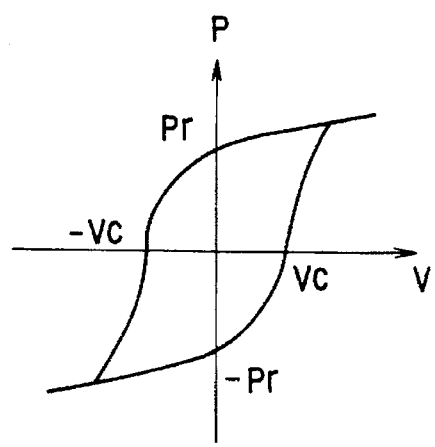
FIG. 4 is a graph showing application voltage-polarization characteristics of a ferroelectric material used in the present invention.

FIG. 4 shows application voltage-polarization characteristics of a ferroelectric material used in the present invention. With reference to FIG. 4, after an application voltage is withdrawn, a polarization state has residual polarization values Pr and −Pr having different polarities in accordance with the polarity of the application voltage.

Figure 5A:
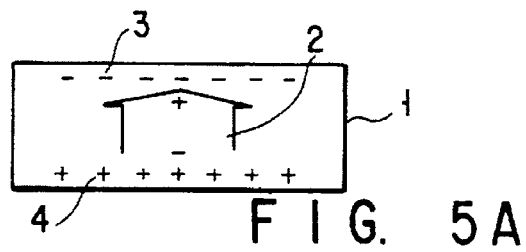
FIGS. 5A, 5B, and 5C are views for explaining an electron beam generation principle of a ferroelectric material used in the electron beam generating apparatus according to the present invention.
Figure 5B:
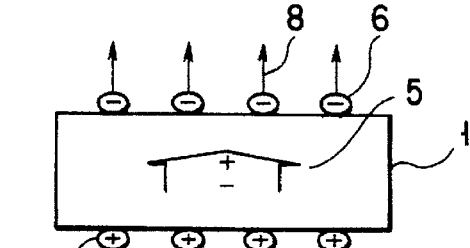
Figure 5C:
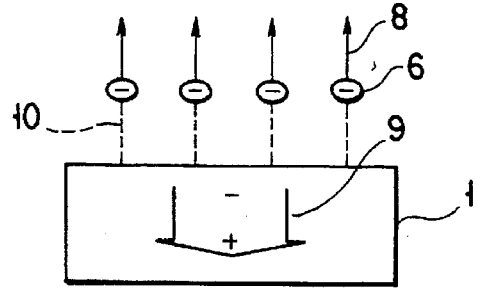

FIGS. 5A, 5B, and 5C are views for explaining the electron beam generating principle of a ferroelectric material used in an electron beam generating apparatus according to the present invention. FIG. 5A shows a state wherein residual polarization (state Pr) 2 is formed in the ferroelectric material 1. In this system, an energetic stable state is obtained as follows. That is, bound charges 3 and 4 are generated by the surfaces of the ferroelectric material 1, and an inverted electric field (not shown) acts in a direction opposite to the residual polarization 2.

When the residual polarization (state Pr) 2 is changed (decreased) by a temperature, a pressure, an external electric field, and the like as shown in FIG. 5B to obtain a state indicated by reference numeral 5, the bound state of some of the bound charges 3 and 4 is released, the charges are set in free charge states 6 and 7, and the free charges float from a pair of electrodes (not shown). The charges can be externally detected, and the charges can be detected as pyroelectric charges for a temperature, as piezoelectric charges for a pressure, and as displacement charges for an external electric field. Note that, when there is no electrode, the charges drift on the ferroelectric material 1.

The free charges are obtained such that the bound state of bound charges is released and the charges are moved on the electrode surface or the ferroelectric material surface, and a force 8 acts on the free charges. This force 8 is proportional to a rate of change in residual polarization over time. Therefore, as shown in FIG. 5C, when the residual polarization is reversed as indicated by an arrow represented by reference numeral 9, the bound state of the charges is released to maximally strengthen the force of moving the charges on the electrode surface or the ferroelectric material surface, the charges 6 are not stopped on the surface of the ferroelectric material 1, and the force 8 acts on the charges 6 such that the charges 6 are emitted in a vacuum space through traces 10.

The above phenomenon has been confirmed in various ferroelectric materials by Asano et al described above.

The phenomenon will be described below using a practical element arrangement.

Figure 6A:
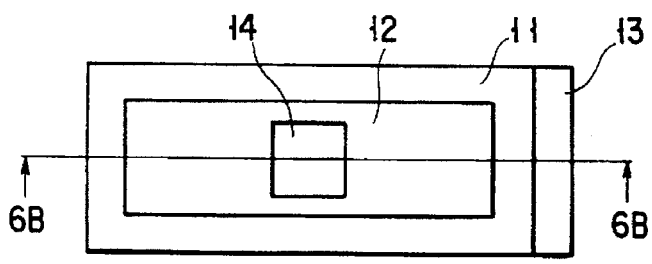
FIGS. 6A and 6B are a plan view showing the basic structure of a ferroelectric electron beam generating element used in the electron beam generating apparatus according to the present invention and a sectional view showing the ferroelectric electron beam generating element along a 6B—6B line in FIG. 6A, respectively.
Figure 6B:
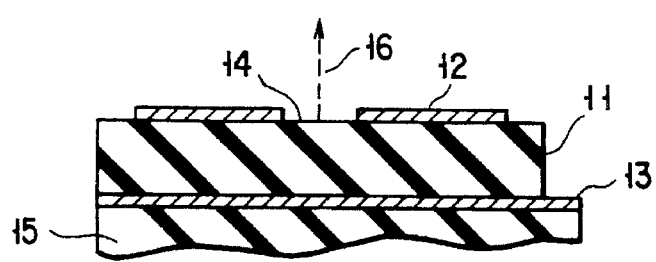
Figure 7A:
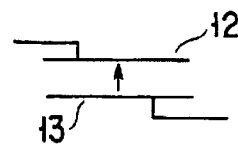
FIGS. 7A, 7B, and 7C are views showing a relationship between an application voltage polarity, polarization reversal, and electron beam generation of the structure of the electron beam generating element in FIGS. 6A and 6B.
Figure 7B:
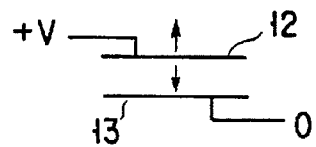
Figure 7C:
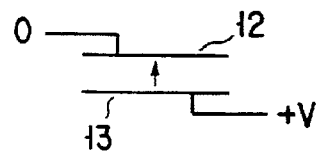

FIGS. 6A and 6B are views showing the basic structure of a ferroelectric electron beam generating element used in an electron beam generating apparatus according to the present invention, and FIGS. 7A, 7B, and 7C are views showing a relationship between an application voltage polarity, polarization reversal, and electron beam generation in the electron beam generating element in FIGS. 6A and 6B.

FIG. 6A is a plan view showing the structure of the electron beam generating element, FIG. 6B is a sectional view showing the structure along a 6B—6B line in FIG. 6A. The electron beam generating element has the following structure. That is, a ferroelectric thin plate or thin film 11 is sandwiched between the upper and lower electrodes 12 and 13, and a square electron beam emission hole 14 is formed in the upper electrode 12. Note that, in FIG. 6B, reference numeral 15 denotes a substrate for mounting the ferroelectric thin plate or thin film 11, and reference numeral 16 denotes the trace of an emitted electron beam.

Electron beam emission can be obtained such that a step-like voltage or a pulse-like voltage having a polarity which is subjected to polarization reversal is applied across the upper and lower electrodes 12 and 13. In this case, since no electrode is present in the electron beam emission hole 14, an electric field does not directly act on this portion. However, the portion is subjected to polarization reversal by the influence of the polarization reversal at a portion where the electrode is present. Therefore, when the area of the electron beam emission hole 14 is excessively large, the polarization reversal of the electron beam emission hole 14 is insufficiently performed, and no electron beam is emitted.

In addition, when polarization reversal is performed once, even when a voltage having the same polarity as that of the element, polarization reversal does not occur, and therefore, no electron beam is emitted. Even a voltage having the polarity reverse to that of the element is applied after polarization reversal, positive charges are discharged. However, since the positive charges are not of an electron beam, the positive charges cannot cause a phosphor (to be described later) to emit light. Note that, although a method of waiting to apply a voltage having the same polarity as the initial polarity is known, time response characteristics are degraded in this method. In contrast to this, the electrode arrangement shown in FIGS. 8A and 8B does not have the above drawback, and an element having the electrode arrangement can emit an electron beam every time a voltage is applied to the element.

Figure 8A:
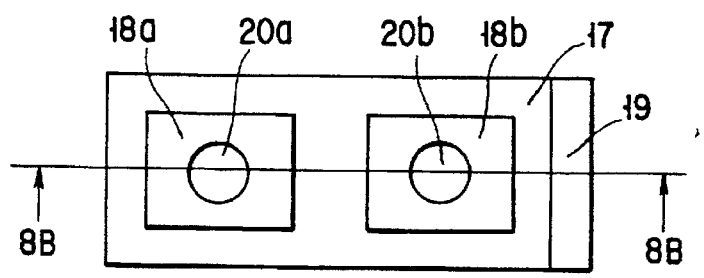
FIGS. 8A and 8B are a plan view showing another structure of the ferroelectric electron beam generating element used in the electron beam generating apparatus of the present invention and a sectional view showing the structure along an 8B—8B line in FIG. 8A, respectively.
Figure 8B:
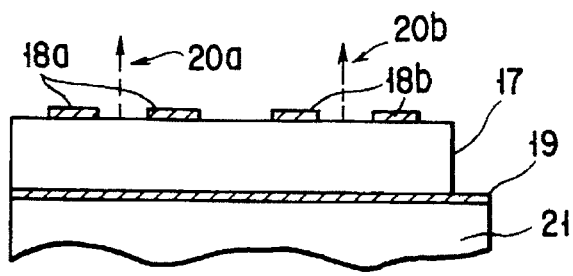

FIGS. 8A and 8B are views showing another structure of a ferroelectric electron beam generating element used in the above electron beam generating apparatus, in which FIG. 8A is a plan view and FIG. 8B is a sectional view showing the structure along an 8B—8B line in FIG. 8A. In FIGS. 8A and 8B, reference numeral 17 denotes a ferroelectric material. Two upper electrodes 18a and 18b and a lower electrode 19 are formed to sandwich the ferroelectric material 17. The two upper electrodes 18a and 18b are separated from each other, and the upper electrodes 18a and 18b have circular electron beam emission holes 20a and 20b, respectively. That is, this electrode structure has a three-terminal structure, and voltage application is performed between the two upper electrodes 18a and 18b. Note that reference numeral 21 denotes a substrate for mounting the ferroelectric thin plate or thin film 17.

Figure 9A:
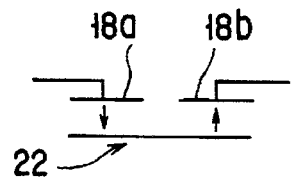
FIGS. 9A, 9B, and 9C are views showing a relationship between an application voltage polarity, a residual polarization direction, and an electron beam emission side.
Figure 9B:
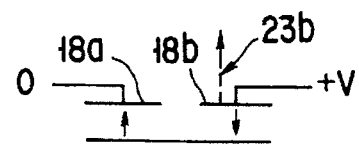
Figure 9C:
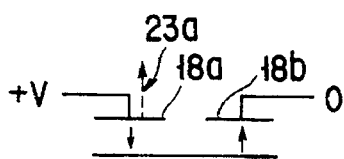

FIGS. 9A, 9B, and 9C are views a relationship between an application voltage polarity, a residual polarization direction, an electron beam emission side. As shown in FIG. 9A, in an electron beam generating element 22, it is assumed that an initial state is a residual polarization state in which the residual polarization faces downward at the upper electrode 18a on the left side in FIG. 9A and upward at the upper electrode 18b on the right side in FIG. 9A. As shown in FIG. 9B, a positive voltage +V is applied to the upper electrode 18b on the right side, and the upper electrode 18b on the left side is grounded (zero voltage), thereby reversing polarization. In this manner, an electron beam 23b is emitted from the upper electrode 18b on the right side. Although the upper electrode 18a on the left side is subjected to polarization reversal, as described above, an electron beam is not emitted from the upper electrode 18a. As shown in FIG. 9C, a positive voltage +V is applied to the upper electrode 18a on the left side, the upper electrode 18b on the right side is set in a ground state (zero voltage), and a voltage is applied to the element. At this time, polarization reversal occurs again, an electron beam 23a is emitted from the upper electrode 18a on the left side, and no electron beam is emitted from the upper electrode 18b on the right side.

As described above, the electrodes are arranged as shown in FIGS. 8A and 8B, and as shown in FIGS. 9B and 9C, positive and negative (or zero potential) pulse voltages are alternately applied across the two upper electrodes 18a and 18b. In this manner, the element can continuously emit an electron beam in response to all voltage pulses.

FIG. 1 is a view showing the circuit arrangement of an electron beam generating apparatus according to the present invention. An electron beam generating cell 24 has a switching transistor 25 and an electron beam generating element 22. The electron beam generating cell 24 has an arrangement obtained by connecting the source of the switching transistor 25 to the upper electrode 18a of the two upper electrodes.

A word line WL is connected to the gate of the switching transistor 25, a drive line DL is connected to the drain of the switching transistor 25, and a bit line BL is connected to the upper electrode 18b of the electron beam generating element 22. A large number of electron beam generating cells 24 which are two-dimensionally aligned are sequentially scanned at timings at which a voltage is applied to these lines.

Figure 2:
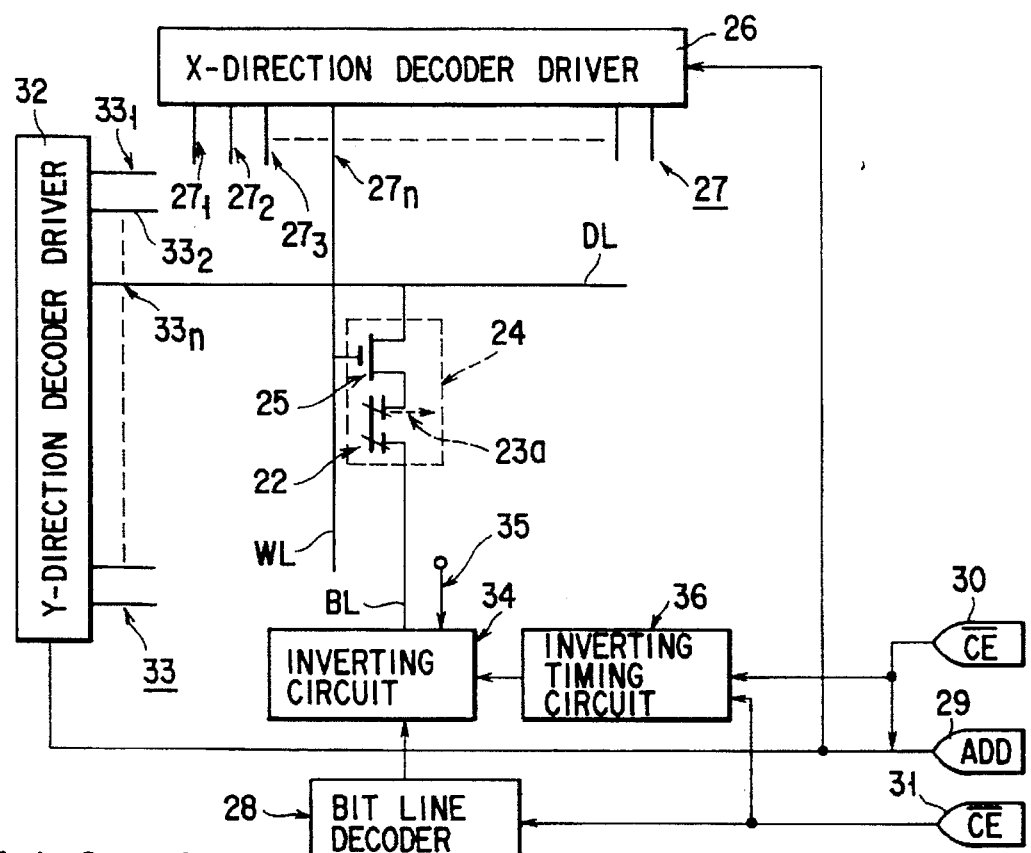
FIG. 2 is a view showing the circuit arrangement of a scanning system of the electron beam generating apparatus according to the present invention.

FIG. 2 is a view showing the circuit arrangement of the scanning system of an electron beam generating apparatus according to the present invention. In FIG. 2, an instruction is input to an address (ADD) terminal 29 such that one of X-direction aligned lines 27 consisting of lines $27_1, 27_2, 27_3, \ldots, 27_n$ is selected by an X-direction decoder driver 26 and the selected line is also selected by a bit line decoder 28.

In this state, one of Y-direction aligned lines 33 consisting of lines $33_1, 33_2, \ldots, 33_n$ is selected by a Y-direction decoder driver 32, and the switching transistor 25 is turned on to apply a voltage across both the upper electrodes 18a and 18b of the electron beam generating element 22.

An inverting circuit 34 connected to the bit line BL detects polarization reversal of the electron beam generating element 22 and causes the bit line side to generate a positive voltage immediately after the drive voltage of the Y-direction aligned line (DL) is set to be 0. The inverting circuit 34 is constituted by a semiconductor memory such as a dynamic random access memory (DRAM) and is the same as a generally used sense amplifier. Discrimination of polarization reversal is performed by comparing the positive voltage with a reference voltage 35.

An inverting timing circuit 36 is a circuit for determining timings at which the detection of polarization reversal is performed. The inverting timing circuit 36 is constituted by a semiconductor memory such as a DRAM as in a sense amplifier and has the same function as that of a generally used sense timing control circuit. Operation instructions are input to these circuits 28, 34, and 36 through chip enable ($\overline{CP}$) terminals 30 and 31.

Figure 3A:
FIGS. 3A, 3B, and 3C are timing charts showing operations of the scanning system of the electron beam generating apparatus in FIG. 2.
Figure 3B:
Figure 3C:
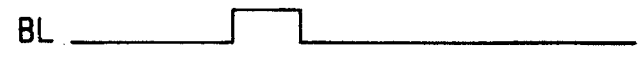

FIGS. 3A, 3B, and 3C are timing charts showing the following operations. FIG. 3A is the timing chart of the voltage of the word line WL, FIG. 3B is a timing chart of the voltage of the drive line DL, and FIG. 3C is a timing chart of the voltage of the bit line BL.

The first embodiment of an electron beam generating apparatus according to the present invention will be described below.

Figure 10:
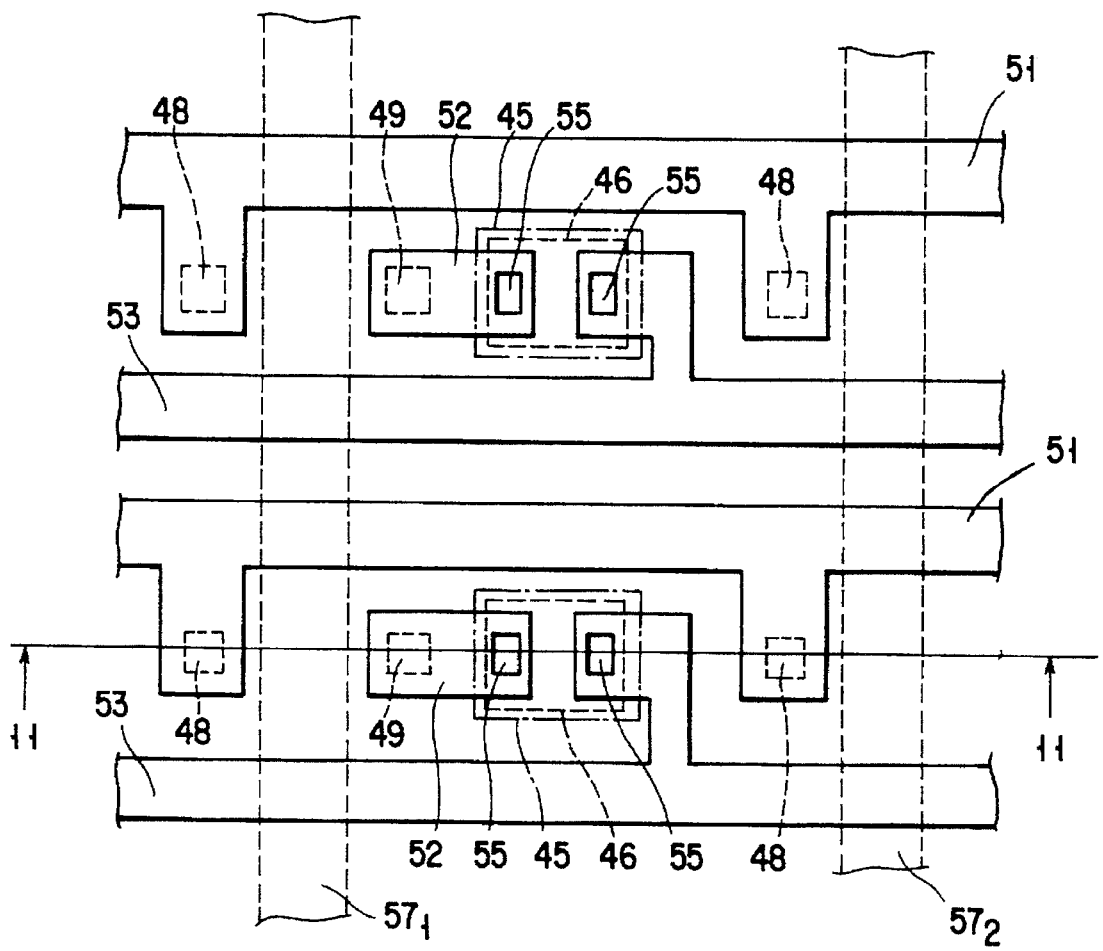
FIG. 10 is a plan view showing the structure of a ferroelectric electron beam generating element used in an electron beam generating apparatus according to the first embodiment of the present invention.
Figure 11:
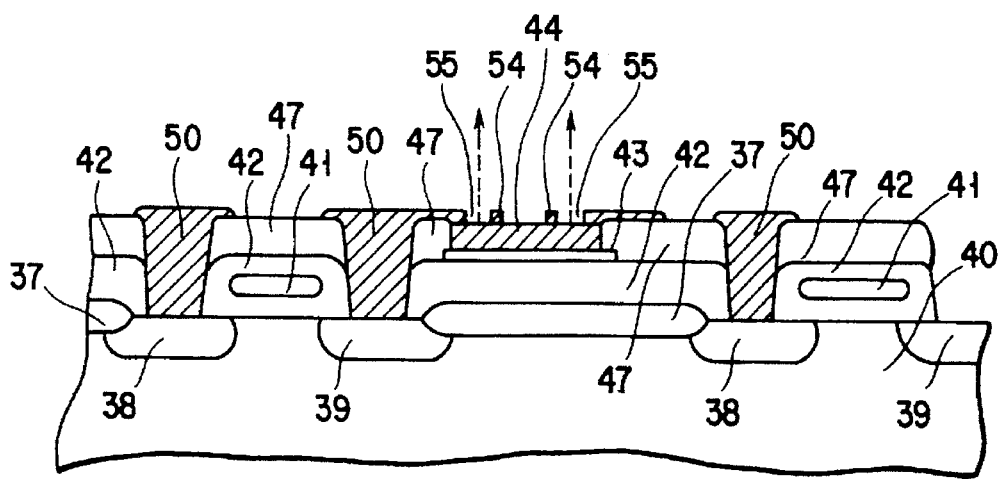
FIG. 11 is a sectional view showing the ferroelectric electron beam generating element along a 11—11 line in FIG. 10.

FIGS. 10 and 11 show the structure of a ferroelectric electron beam generating element used in the electron beam generating apparatus according to the present invention, in which FIG. 10 is a plan view and FIG. 11 is a sectional view showing the structure along a 11—11 line in FIG. 10. FIGS. 12A, 12B, 12C, and 12D are views showing a process of manufacturing the ferroelectric electron beam generating element.

Figure 12A:
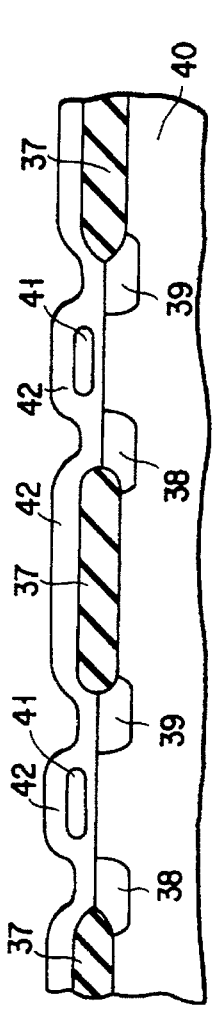
FIGS. 12A to 12D are views showing a process of manufacturing the ferroelectric electron beam generating element in FIG. 11.

A gate electrode 41 and an insulating interlayer 42 are formed on a semiconductor substrate 40 on which a field oxide film 37, a diffusion portion (drain region) 38, and a diffusion portion (source region) 39 are formed (FIG. 12A).

Figure 12B:
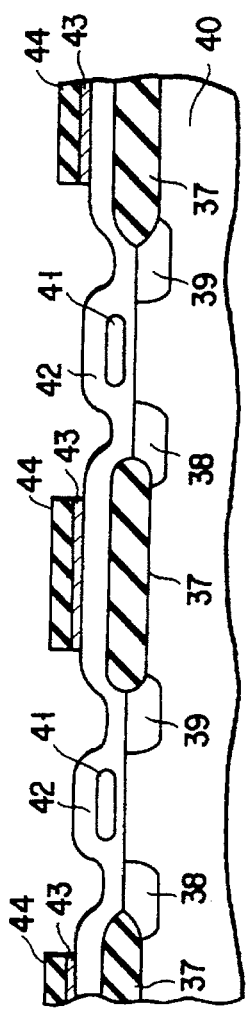

A lower electrode 43 consisting of platinum or the like is formed on the insulating interlayer 42 at a portion opposite to the field oxide film 37 (FIG. 12B).

Figure 12C:
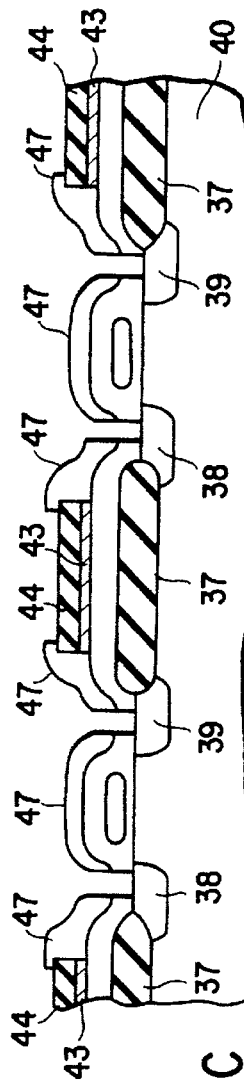

In addition, a ferroelectric thin film 44 consisting of a Bi layered structure ferroelectric material such as barium titanate $BaTiO_3$, zircon lead titanate $Pb(ZryTi)O_3$ (to be referred to as PZT hereinafter), lead titanate $PbTiO_3$ (to be referred to as PT hereinafter), or $Bi_4Ti_3O_{12}$ is formed on the lower electrode 43 by sputtering, sol/gel spin-on, chemical vapor deposition (CVD), or the like (FIG. 12B). Thereafter, the lower electrode 43 and the ferroelectric thin film 44 are etched by ion-beam milling, reactive ion etching (RIE), or the like to form island-like films 45 and 46 (see FIG. 10). Thereafter, a second insulating interlayer 47 is formed to cover the island-like films 45 and 46 which are formed by etching (FIG. 12C).

Figure 12D:
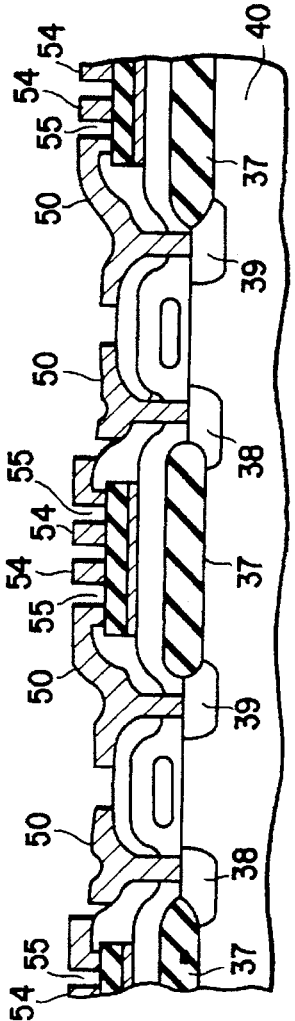

After contact holes 48 and 49 are formed to cause electrodes to be in contact with the diffusion regions 38 and 39 (see FIG. 10), a metal layer for forming wiring electrodes and an upper electrode (wiring electrodes 51, 51, 52, and 53 and an upper electrode 54) are formed. Thereafter, the metal layer is etched to leave an electron beam emission hole 55, the upper electrode 54, and the wiring electrodes 50, 51, 52, and 53 (FIG. 12D). Note that reference numerals $57_1$ and $57_2$ in FIG. 10 denote word lines.

Since the operation circuit of the electron beam generating apparatus of this embodiment is the same as the above circuit shown in FIG. 2, a description thereof will be omitted to avoid descriptive repetition.

The second embodiment of the present invention will be described below.

FIG. 13 shows the second embodiment and is a view showing the circuit arrangement of an image storage type electron beam generating apparatus.

An electron beam generating cell 24 is also used as a memory cell 24. The arrangement of the electron beam generating cell 24 is the same as that of the first embodiment, and only a peripheral circuit is used as a circuit for operating a memory.

The storage state in FIG. 9A is set to a storage state of "1" corresponding to the state of −Pr in FIG. 4, and the storage state in FIG. 9B is set to a storage state of "0" corresponding to the state of Pr in FIG. 4.

As shown in FIG. 4, a ferroelectric material has a characteristic feature of holding a storage state without voltage application, and can be used as a nonvolatile memory. A switching transistor 25 functions as an access transistor and is connected in series with an electron beam generating element 22, i.e., a ferroelectric capacitor 22a, when the memory cell 24 receives a selection signal.

When the switching transistor 25 is turned on, a series circuit is formed between a drive line DL and a bit line BL through the electron beam generating element 22, i.e., the ferroelectric capacitor 22a, and the switching transistor 25. This circuit can set the polarity of a voltage applied across two upper electrodes 18a and 18b of the ferroelectric capacitor 22a in two positive and negative states so as to generate two polarization states having the values of Pr and −Pr in a relative voltage state of the drive line DL and the bit line BL. This function corresponds to a function of writing data in the memory cell 24.

When a positive pulse is applied to the drive line DL, and the bit line BL is set in a ground state, a data signal corresponding to a polarization state and stored in the ferroelectric capacitor 22a is generated by the bit line BL, thereby obtaining a function of reading data from the memory cell 24.

A positive pulse is applied to the drive line DL, and the bit line BL is set in a ground state. In this state, as is apparent from FIG. 4, when a state having a value of Pr ("0") is set, a polarization change amount after the pulse is disabled is zero; when a state having a value of −Pr ("1") is set, a polarization change amount after the pulse is disabled is 2Pr. Therefore, a charge amount corresponding to each of the polarization change amounts is input to the inverting circuit/sense amplifier 61.

As described above, reading the state of −Pr ("1") means that the state of −Pr ("1") is inverted into the state of Pr ("0") to break an original storage state. Therefore, a rewrite operation must be performed to set an initial storage state. As this rewrite operation, the following operation is used. That is, when the state of −P ("1") is read, a charge amount is input to the inverting circuit/sense amplifier 61 so that a positive pulse voltage is applied from the inverting circuit/sense amplifier 61 after the positive pulse applied to the drive line DL is disabled.

A timing control circuit 62 determines timings at which the inverting circuit/sense amplifier 61 is operated, and a signal amount obtained when the state of Pr ("0") is read is changed depending on the determined timing. That is, when each interval between the timings at which the inverting circuit/sense amplifier 61 is operated falls within the pulse width of a positive pulse applied to the drive line DL, a readout signal in the state of Pr ("0") is not set to be "0", thereby decreasing the difference between the readout signal and a signal obtained when the state of −Pr ("1") is read out.

On the other hand, when each interval between the timings at which the inverting circuit/sense amplifier 61 is operated is larger than the pulse width of the positive pulse applied to the drive line DL so as to delay a pulse end time, the readout signal in the state of Pr ("0") goes to "0", thereby increasing the difference between the readout signal and the signal obtained when the state of −Pr ("1") is read out. In any case, the inverting circuit/sense amplifier 61 preferably determines a storage state by comparing an applied voltage with a reference voltage 35.

Note that the decoder 63 is operated by receiving an output from the inverting circuit/sense amplifier 61 and an operation instruction from an input/output (I/O) interface terminal 64, a chip enable ($\overline{CE}$) terminal or a read/write terminal (R/W) 65.

As described above, when the electron beam generating apparatus is arranged as shown in FIG. 13, an output image can be stored as nonvolatile data.

Note that in each of the first and second embodiments, a screen on which a phosphor is coated and a vacuum atmosphere are required to output an image.

FIG. 14 shows the sectional structure of an electron beam generating apparatus having the screen on which the phosphor is coated and the vacuum atmosphere. That is, spacers 66 are formed on the second insulating interlayer 47 on the electron beam emission surface side. A screen 68 having a lower surface on which a phosphor 67 is coated is arranged on the spacers 66 to oppose the apparatus, thereby forming a gap portion 69. The gap portion 69 is set in a vacuum atmosphere having a pressure of $10^{-4}$ Torr or more, thereby completing a sealing operation of the element.

The third embodiment of the present invention will be described below.

Figure 15A:
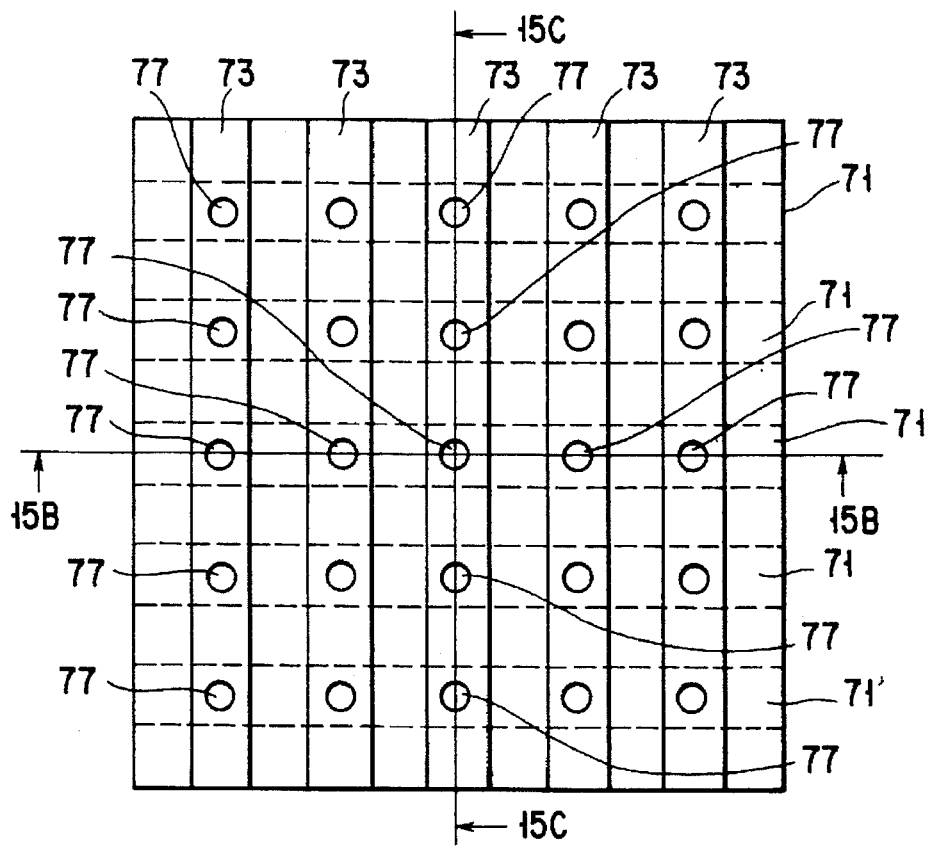
FIGS. 15A, 15B, and 15C are a plan view showing the structure of an electron beam generating apparatus according to the third embodiment of the present invention and sectional views showing the structure along a 15B—15B line and a 15C—15C line in FIG. 15A, respectively.
Figure 15B:
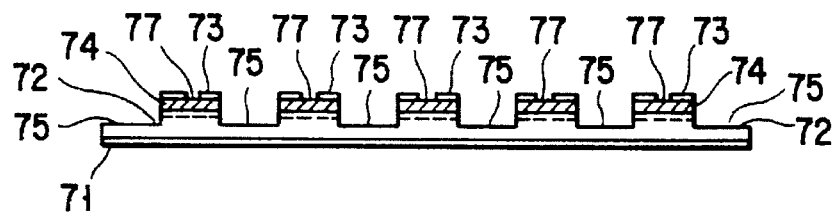
Figure 15C:
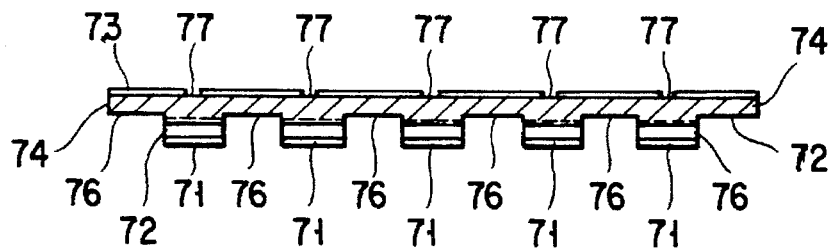

FIGS. 15A, 15B, and 15C show the third embodiment of the present invention, in which FIG. 15A is a plan view, FIG. 15B is a sectional view along a 15B—15B line in FIG. 15A, and FIG. 15C is a sectional view along a 15C—15C line in FIG. 15A.

An operation of the third embodiment will be described below with reference to FIGS. 16A and 16B to FIGS. 19A, 19B, and 19C. In the third embodiment, for descriptive convenience, a case wherein 5×5 electron beam cells are arranged will be described.

The electron beam generating apparatus shown in FIGS. 15A, 15B, and 15C has a junction structure constituted by a ceramic varistor thin plate 72 and a ferroelectric ceramic thin plate 74. That is, the ferroelectric ceramic thin plate 74 consisting of zircon lead titanate PZT and having both the surfaces on which electrodes consisting of silver or the like are formed (although only one surface (73) is shown in FIGS. 15A and 15B) is combined by a brazing material containing silver with the ceramic varistor thin plate 72 having both the surfaces on which electrodes consisting of silver or the like (although only one surface (71) is shown in FIGS. 15A, 15B, and 15C) and obtained by adding antimony Sb, cobalt Co, and manganese Mn to a zinc-oxide-based compound, more particularly, zinc oxide ZnO-bismuth monoxide $Bi_2O_3$.

In addition, grooves 75 and 76 are formed in both the surfaces of the junction structure. Electron beam emission holes 77 are formed in the upper electrode. The structure having the grooves has a small thickness at electron beam emission cell portions and a large thickness at portions other than the electron beam emission cell portions.

An electron beam emitting operation of the above structure will be described below.

An equivalent circuit corresponding to one electron beam generating cell, as shown in FIGS. 17 and 18, can be represented by a series circuit constituted by a ferroelectric electron beam generating element 81 and a symmetrical varistor 82 having switching characteristics $P_1$ shown in FIG. 19A. More specifically, the symmetrical varistor 82 can be represented by a parallel circuit obtained by connecting a capacitor 83 and a variable DC resistor 84.

The polarization-voltage characteristics of a ferroelectric material, if the ferroelectric material is a simple substrate, vary between lots or within a lot as indicated by reference symbols $P_2$ (solid line) and $P_3$ (dotted line) in FIG. 19B. In this case, variations in coercive electric field pose a problem, and it is very difficult to determine an application voltage.

However, when the symmetrical varistor 82 having the switching characteristics is connected in series with the ferroelectric material, the polarization-voltage characteristic curve has a square shape as indicated by $P_4$ in FIG. 19C, and the coercive electric field becomes stable. In this manner, the switching element is required because of the following reason. That is, when only stripe electrodes which are vertically perpendicular to each other and shown in FIG. 16A are used, a voltage shown in FIG. 16B is applied to non-selected cells, and as indicated by P2 in FIG. 19B, a voltage of (½)Vapp applied to the non-selected cells causes depolarization from F to F' in FIG. 19B so as to break the polarization state.

As shown in FIG. 16A, when the stripe electrodes (e.g., 3×3 electrodes) which are vertically perpendicular to each other are arranged on each of both the surfaces of a ferroelectric thin film, and a write and read voltage Vapp is applied to, e.g., a cell $C_{32}$, voltages of (⅔)Vapp and (⅓) Vapp are applied to the non-selected cells as shown in FIG.

16B. In addition, when an n×n memory cells are used, a voltage of (n−1)/(2n−1)·Vapp or 1/(2n−1)·Vapp is applied to a selected memory cell. Therefore, when n is large, a maximum voltage applied to non-selected cells is ½·Vpp.

As shown in FIGS. 17 and 18, when the polarization-application voltage characteristics shown in FIG. 19C and obtained by series-connecting the ferroelectric electron beam generating element 81 to the symmetrical varistor 82 having the switching characteristics indicated by $P_1$ in FIG. 19A are used, a residual polarization value is not changed by the voltage (½)Vapp applied to the non-selected cells. Although the symmetrical varistor is used because of the same reason as that for using the switching transistor in the first embodiment, the structure of the symmetrical varistor is simpler than that of the switching transistor. An electron beam emitted from the apparatus is radiated on the phosphor-coated surface of the screen 68 as described above, and the electron beam emitted from the surface of the screen 68 as a self-emission type beam can be visually recognized.

As described above, according to the first to third embodiments, an electron beam generating apparatus capable of simultaneously satisfying a high image resolution, excellent time response, a wide field angle, a self-emission property, low power consumption, and a low cost can be provided. When the electron beam generating apparatus and a screen on which a phosphor is coated are used, a self-emission type image display apparatus having excellent time response and a high image resolution can be realized.

An electrical light-emitting surface light source element according to the fourth embodiment of the present invention will be described below with reference to FIGS. 20A and 20B.

FIG. 20A is a perspective view showing the entire light source element, and FIG. 20B is a sectional view showing the light source element. In FIGS. 20A and 20B, reference numeral 100 denotes a substrate for a display. A plurality of electron beam generating units 200 are arranged in a matrix form on the substrate 100 (one of the electron beam generating units 200 is representatively shown in FIGS. 20A and 20B). This substrate 100 consists of an insulator, or an insulating film is formed on the substrate 100, and adjacent electrical light-emitting surface light source elements are electrically separated from each other. Each of the electron beam generating units 200 is constituted by a lower electrode 110 directly formed on the substrate 100, a ferroelectric thin film 120 formed on the lower electrode 110, a semiconductor layer 140 formed on the ferroelectric thin film 120, and an upper electrode 130. The thickness of the ferroelectric thin film 120 is very small, and preferably falls within a range of 50 nm to 2 μm. An circular opening 130a is formed at the center of the upper electrode 130, and a part of the upper surface of the semiconductor layer 140 is exposed in the opening 130a. In this embodiment, although the opening 130a is formed in a circular shape, the shape is not limited to this, and the opening 130a may be formed to have a triangular shape, a rectangular shape, and a hexagonal shape.

Figure 21:
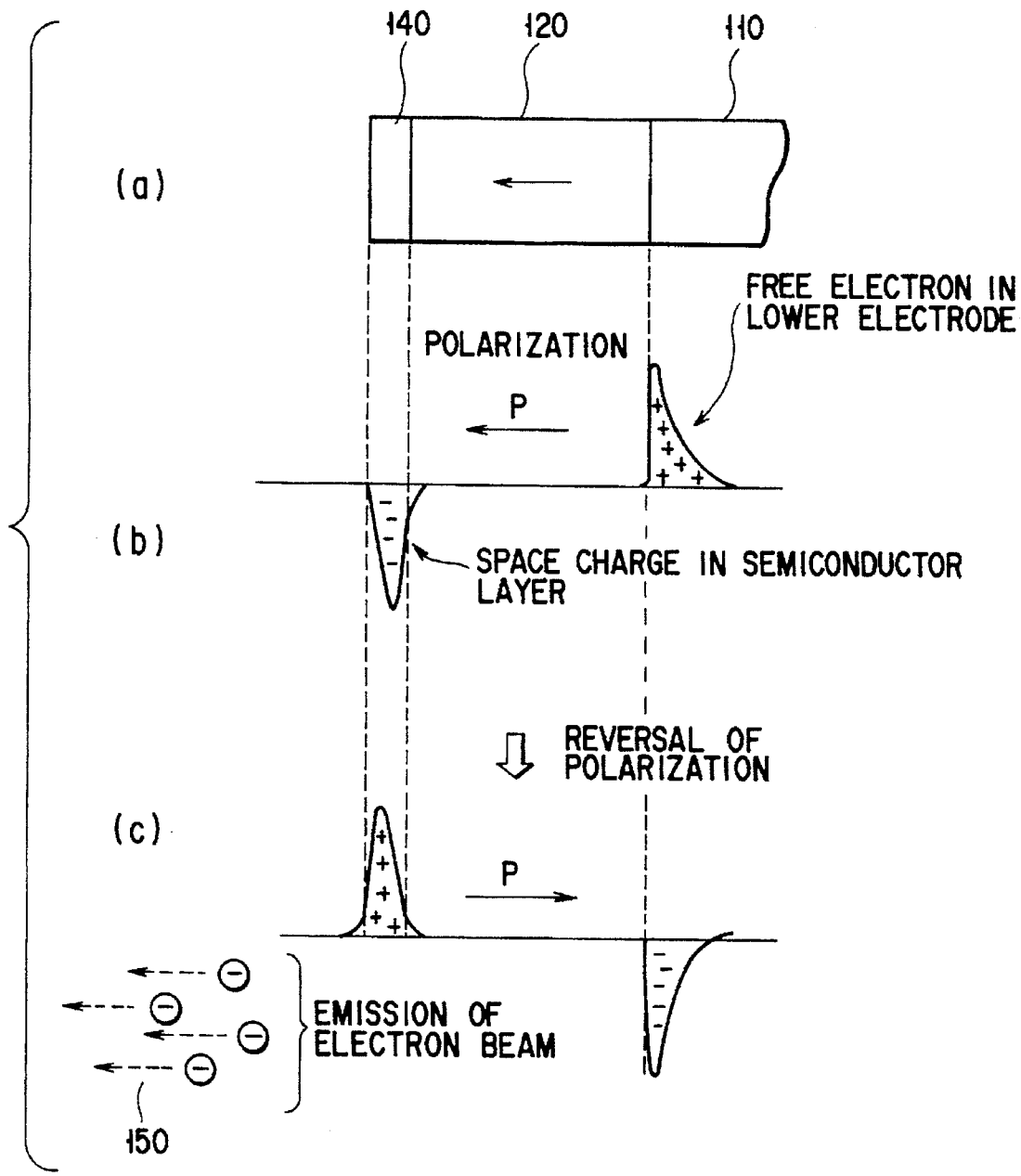
FIG. 21 is a view for explaining the electron beam generating mechanism of an electron beam generating apparatus according to the present invention.

The electron-beam emitting mechanism of the electron beam generating unit having the above arrangement will be described below with reference to FIG. 21.

FIG. 21A simply shows the lower electrode 110, the ferroelectric thin film 120, and the semiconductor layer 140 of the above unit.

As shown in FIG. 21B, when spontaneous polarization P in the ferroelectric thin film 120 faces the semiconductor layer 140, charges are generated by the lower electrode 110 and the upper electrode 130 inside the semiconductor layer 140 to cancel the spontaneous polarization. When the charges are not generated, an energy is increased by the divergence of dielectric flux density to degrade stability. As a result, carriers (electrons) serving as space charges are generated in the semiconductor layer 140. That is, since a polarization reversal layer does not stably exist without the semiconductor layer 140, a small number of charges are generated. At this time, when the spontaneous polarization P is reversed by applying an inverted voltage to the electrodes, as shown in FIG. 21C, the negative charges on the surface of the semiconductor layer 140 are changed into positive charges. At this time, since the mobility of electrons and holes of the semiconductor layer 140 is very low (about 1 cm/s), there is no time required for recombining the electrons and holes. That is, the charges strongly repel each other. As a result, electrons (beam 150) are emitted from the semiconductor layer 140 at high efficiency.

As shown in FIGS. 22A and 22B, the electron beam generating unit 200 with the above arrangement is combined with a transistor 160, and a plurality of combinations are arranged in a matrix form to form a display pixels, thereby obtaining a display device. This display device will be described below. Note that FIG. 22A is a sectional view showing a part of the display device, and FIG. 22B is a view showing a wiring relationship between the electron beam generating unit 200 and the transistor 160 serving as a drive element.

In FIG. 22a, reference numeral 300 denotes a p-type silicon substrate. The plurality of electron beam generating units 200 arranged in a matrix form (one of the electron beam generating units 200 is representatively shown) and the n-channel metal oxide silicon (n-MOS) transistor 160 arranged in correspondence with each of the electron beam generating units 200 are formed on the silicon substrate 300. The upper surface of the silicon substrate 300 except for a portion at which the transistor 160 is formed is covered with a field oxide film 320 and a passivation film 320a, and the substrate 100 is constituted by the oxide film 320, the passivation film 320a, and the silicon substrate 300. The lower electrode 110 is formed on the oxide film 320, and an insulating film 330 is formed to electrically insulate adjacent lower electrodes 110 from each other.

On the other hand, an n-type source region 340 and a drain region 350 are formed on the exposed upper surface of the silicon substrate 300. A gate electrode 360 is formed on a channel between the source and drain regions 340 and 350 through a gate insulating film 360a. The drain region 350 and the upper electrode 130 are electrically connected to each other by a drain electrode 370.

A light-emitting portion 220 is formed above the silicon substrate 300 through a pedestal spacer 400 so as to be slightly separated from the transistor 160 and the electron beam generating units 200. The light-emitting portion 220 is constituted by a phosphor film 250 which consists of ZnS doped with an impurity and on which electrons from the electron beam generating unit 200 are incident to emit light, and a transparent electrode 260 which is formed on the phosphor film 250, can emit light from the phosphor film 250 outside the device, and is formed by, e.g., ITO.

In the display device with the above arrangement, the electron beam 150 is emitted from the electron beam generating unit 200 selected by the above mechanism toward the phosphor film 250. At this time, when an acceleration voltage is applied across the electron beam generating unit 200 and the transparent electrode 260 by a means (not shown), the electron beam is accelerated in the space between the electron beam generating unit 200 and the phosphor film 250 to be incident on the phosphor film 250. In this case, in order to keep the intensity of the electron beam 150 which is incident from the electron beam generating unit 200 on the phosphor film 250 constant, the distance between the electron beam generating units 200 and the phosphor film 250 is preferably kept constant. For this reason, the pedestal spacer 400 is used in this embodiment.

Although the lower electrode 110 and the upper electrode 130 are not particularly limited to specific ones, the lower and upper electrodes 110 and 130 can be constituted by of a Pt layer or a combination between a Pt layer and a buffer layer. For example, the lower and upper electrodes 110 and 130 can consist of Pt/Ti, Pt/Ta, Pt/TiN, Pt/TiW, a noble metal such as Ag, Au, or Pd, an Ni alloy, or a refractory metal such as Ni, Mo, W, Cr, TiN, TiW, or the like.

The ferroelectric thin film 120 can consist of a perovskite compound, a titanate-based compound such as $BaTiO_3$, $(Ba,Sr)TiO_3$, $SrTiO_3$, $PbTiO_3$ (PT), $Pb(Zr,Ti)O_3$ (PZT), or $(Pb,La)(ZrTi)O_3$, a niobate-based compound such as $Pb(Mg_{1/3},Nb_{2/3})O_3$, $LiNbO_3$, $LiTaO_3$, $KNbO_3$, $K(Ta,Nb)O_3$, a tungstenybronze-based compound such as $(Sv,Ba)Nb_2O_6$, $(Sv,Ba)_{0.8}RxNa_{0.4}Nb_2O_6$, $(Pb,BA)Nb_2O_6$, $(K,Sr)Nb_2O_6$, $(pb,K)Nb_2O_6$, $Ba_2NaNb_5O_{15}$, PBN, KSN, PKN, or BNN, or a Bi-based layered perovskite compound.

An electron beam generating element according to the fifth embodiment will be described below together with a method of manufacturing the electron beam generating element with reference to FIGS. 23A to 23D.

Figures 23A, 23B, 23C, 23D, 24, 25A, 25B, 25C:
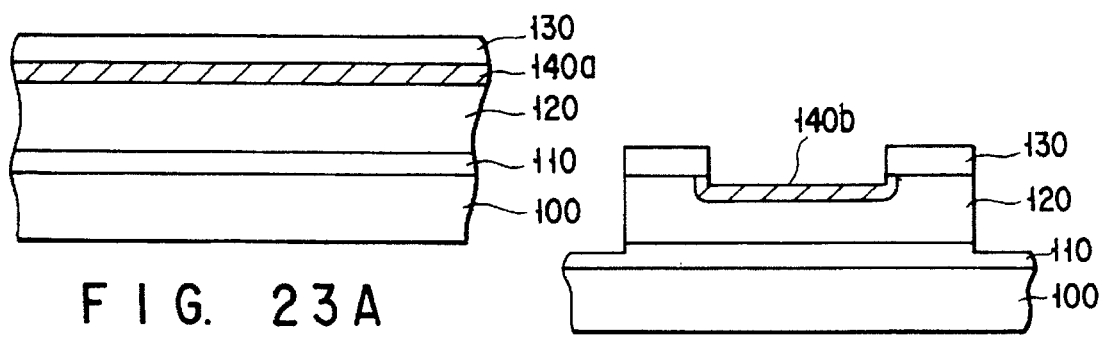
FIGS. 23A to 23D are sectional views showing an electron beam generating apparatus according to the fifth embodiment of the present invention with reference to a method of manufacturing the electron beam generating apparatus.
FIG. 24 is a sectional view showing an electron beam generating apparatus according to the sixth embodiment of the present invention.
FIGS. 25A to 25C are views showing an electron beam generating apparatus according to the seventh embodiment of the present invention with reference to a method of manufacturing the electron beam generating apparatus.

As shown in FIG. 23A, a lower electrode 110, a ferroelectric thin film 120, a semiconductor layer 140a, and an upper electrode 130 are sequentially formed on a substrate 100. The ferroelectric thin film 120 is formed by, e.g., a spin coating method such as a sol/gel method or MOD, a spattering method, a MO-CVD method, an ICB method or the like. When the ferroelectric thin film 120 is annealed in an $O_2$ gas atmosphere or another gas atmosphere containing a proper component, a constituent element in the ferroelectric thin film 120 is extracted to set the surface of the ferroelectric thin film 120 in a semiconducting state, thereby spontaneously forming the semiconductor layer 140a.

As shown in FIG. 23B, the ferroelectric thin film 120, the semiconductor layer 140a, the upper electrode 130 are separated from each other by etching to respectively have island-like shapes.

As shown in FIG. 23C, an opening 130a is formed by selective etching from the upper surface of the upper electrode 130. This etching can be performed by the known method such as ion milling, reactive ion etching, or wet etching. In this etching, since it is considerably difficult to etch only the upper electrode 130 without etching the thin semiconductor layer 140, as practically shown in FIG. 23C, the semiconductor layer 140a is also etched.

For this reason, as shown in FIG. 23D, when the resultant structure is annealed in an $O_2$ or $N_2$ gas atmosphere or in the air again, a semiconductor layer 140b is formed on the surface of the ferroelectric thin film 120 exposed by the etching. Note that the temperature of this annealing is changed depending on the material of the ferroelectric thin film 120. For example, when PZT or PTO is used, the temperature is preferably set to be 500° to 800° C.; when a Bi-based layered perovskite compound is used, the temperature is preferably set to be 600° to 900° C.

An electron beam generating apparatus according to the sixth embodiment shown in FIG. 24 is the same as that of the fifth embodiment except that a semiconductor layer 140a (which is spontaneously formed in the fifth embodiment) is positively formed because the semiconductor layer 140a increases a coercive voltage Vc and decreases a polarization amount P so as to decrease the intensity of a generated electron beam 150.

An electron beam generating apparatus according to the seventh embodiment will be described below together with a method of manufacturing the electron beam generating apparatus with reference to FIGS. 25A to 25C.

As shown in FIG. 25A, a lower electrode 110, a ferroelectric thin film 120, and a semiconductor layer 140 are sequentially formed on a substrate 100, and the ferroelectric thin film 120 and the semiconductor layer 140 are separated from each other by etching to respectively have island-like shapes.

As shown in FIG. 25B, a resist film 500 is formed at the peripheral and central portions of the upper surface of the semiconductor layer 140 so as to expose the upper surface of the semiconductor layer 140 in an annular shape.

Thereafter as shown in FIG. 25C a metal is deposited on the exposed portion of the semiconductor layer 140 to form an upper electrode 130 having an opening 130a in its inside, and the resist film 500 is removed, thereby completing an electron beam generating apparatus. Note that the structure shown in FIG. 25C can also be obtained by patterning the upper electrode 130 by wet etching or reactive etching in the step shown in FIG. 23B. In addition, the lower electrode 110 and the upper electrode 130 can consist of Pt, Ag, Ta, TiN, an Ni alloy, a Ta alloy, or a Pt alloy. When a material having a poor adhesive property to the substrate 100 is used as the material of the lower electrode 110, an adhesive layer such as a Ti layer, a TiN layer, a Cr layer, an Mo layer, and an Mn layer is preferably formed between the lower electrode 110 and the substrate 100.

Although an apparatus of the eighth embodiment shown in FIG. 26 is similar to that of the embodiment shown in FIG. 24, in the apparatus of the eighth embodiment, a semiconductor layer 140 is formed by depositing another material on the upper surfaces of a ferroelectric thin film 120 and an upper electrode 130. In this case, the semiconductor layer 140 may consist of a material for forming the ferroelectric thin film 120 or a VI, III–V, or II–VI group monocrystalline or polycrystalline semiconductor such as Si, Ge, SiC, GaAs, or InP When the semi 140 consists of the material for forming the ferroelectric thin film 120, if a thin film is deposited on the ferroelectric thin film 120, the thin film is almost spontaneously changed into a semiconductor film. However, even if the thin film is incompletely changed into a semiconductor film, the same effect as that obtained when a semiconductor film is used can be obtained because a spatial charge region is formed between the ferroelectric thin film 120 and the semiconductor layer 140. In addition, when the monocrystalline or polycrystalline semiconductor is used, the semiconductor satisfactorily functions as a charge trap region because the carrier mobility of the semiconductor is low. In addition, the semiconductor layer 140 may consist of a compound such as $YBa_2Cu_3O_7$ or $LaAlO_3$ having high-temperature superconductive characteristics, or the semiconductor layer 140 may consist of $BaTiO_3$ or $SrTiO_3$ which is changed into a semiconductor.

An apparatus according to the ninth embodiment shown in FIG. 27, a semiconductor layer 140 is separated by an annular channel 140c into a circular central portion and a charge discharging portion located under an upper electrode 130. The apparatus with the above arrangement is effectively used when the semiconductor layer 140 is formed by a material having a relatively high conductivity. In this apparatus, after polarization reversal is performed in the ferroelectric thin film 120, electrons are emitted from the ferroelectric thin film 120 and injected into the semiconductor layer 140 to be emitted in the semiconductor layer 140. When the electrons are horizontally diffused in the ferroelectric thin film 120 to reach the upper electrode 130, the electrons become a reactive current. For this reason, in order to prevent the electrons from becoming the reactive current, the horizontal diffusion of the electrons is restricted by the channel 140c.

The channel 140c may be formed by photoetching using a mask or may be formed such that only the peripheral portion of the upper electrode 130 is etched by tilted reactive etching, spattering, or ion milling.

In an apparatus according to the tenth embodiment shown in FIG. 28, a projection portion 140b projecting upward is formed at a portion of a semiconductor layer 140 located immediately under an opening 130a of an upper electrode 130, and electrons are concentrated on the projection portion 140b, thereby efficiently emitting an electron beam 150. Note that, even when the diameter of the opening 130a is decreased in the apparatus shown in FIG. 27, the same effect as that of the tenth embodiment can be obtained.

Figure 29:
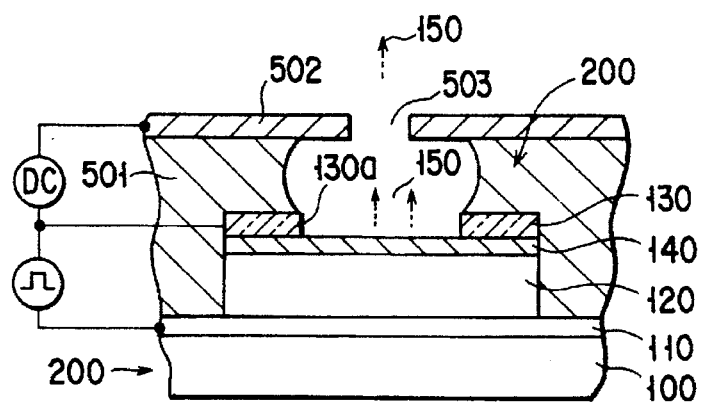
FIG. 29 is a sectional view showing an electron beam generating apparatus according to the eleventh embodiment of the present invention.

In the eleventh embodiment shown in FIG. 29, a dome-like dielectric layer 501 is formed on an electron beam generating unit 200, an auxiliary electrode 502 is formed on the dielectric layer 501, and a through hole 503 for an electron beam 150 is formed at a portion opposite to an opening 130a of the dielectric layer 501 and the auxiliary electrode 502. When a DC voltage DC is applied across an upper electrode 130 and an auxiliary electrode 502, the electron beam 150 is accelerated in the through hole 503 and emitted outside the through hole 503. In this case, the dielectric layer 501 may consist of an organic material such as multilayered polyimide (PiQ) or polyimide. Note that a pulse for polarization reversal is applied across a lower electrode 110 and the upper electrode 130.

Figure 30A:
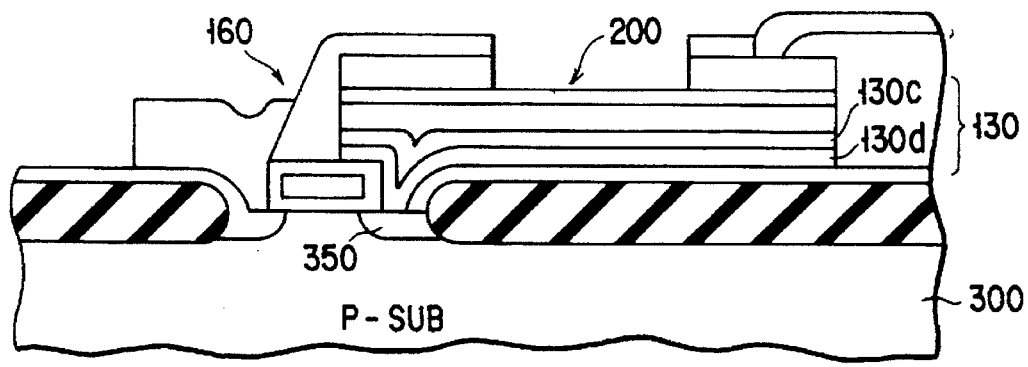
Figure 30B:
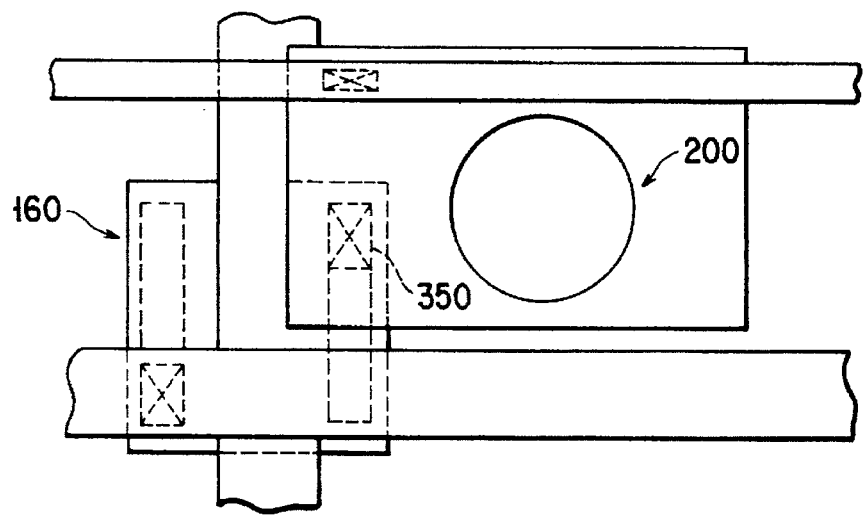

Electron beam generating units 200 and transistors 160 are combined with each other, and the combinations are arranged in a matrix form to form display pixels, thereby obtaining another display apparatus. This display apparatus will be described below as the twelfth embodiment with reference to FIGS. 30A and 30B. Note that FIGS. 30A and 30B are similar to FIGS. 22A and 22B, respectively, in which FIG. 30A is a sectional view showing a part of the display apparatus, and FIG. 30B is a view showing a wiring relationship between one of the electron beam generating units 200 and one of the transistors 160 serving as drive elements for the electron beam generating units 200.

In this embodiment, the electron beam generating unit 200 extends to a drain region 350 of the MOS transistor 160, lower electrodes 130 of the electron beam generating units 200 are in ohmic contact with the drain region 350. The lower electrode 130 has a two-layered structure constituted by an upper layer 130c and a lower layer 130d, the lower electrode 130c consists of a material having an excellent barrier property to the upper layer 130d and an excellent ohmic contact property to the drain region 350. As this material, TiN, W, TiW, Ti, Ta, Mo, Cu, an alloy containing such an element as a main component, or a compound such as PtSi, PbSi, TiSi, or WSi obtained by combining silicide and other metals can be used.

A scheme for driving an electron beam generating apparatus according to the present invention will be described below with reference to FIGS. 31, 32A, and 32B.

Figure 31:
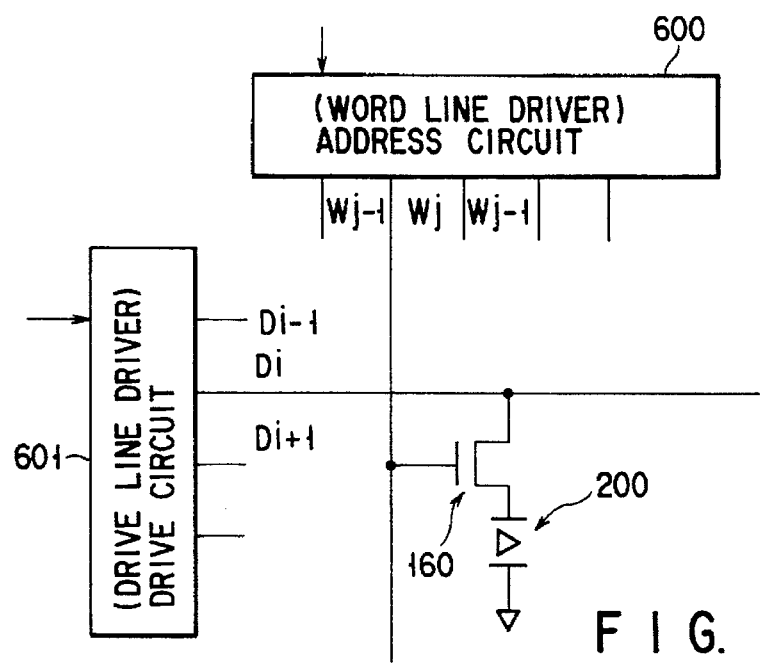
FIG. 31 is a view showing the drive circuit of the electron beam generating apparatus of the present invention.

As shown in FIG. 31, the gate electrode of each transistor 160 is connected to an address circuit 600 serving as a word line driver, and the source electrode of the transistor 160 is connected to a drive circuit 601 serving as a drive line driver. The drain electrode of the transistor 160 is connected to the upper electrode of an electron beam generating unit 200, and the lower electrode of the electron beam generating unit 200 is grounded.

In the above wiring structure, a transistor 160 is selectively switched by a drive signal on the basis of image information from the address circuit 600 and the drive circuit 601 so as to drive the electron beam generating unit 200, so that a predetermined electron beam can be emitted.

Figure 32A:
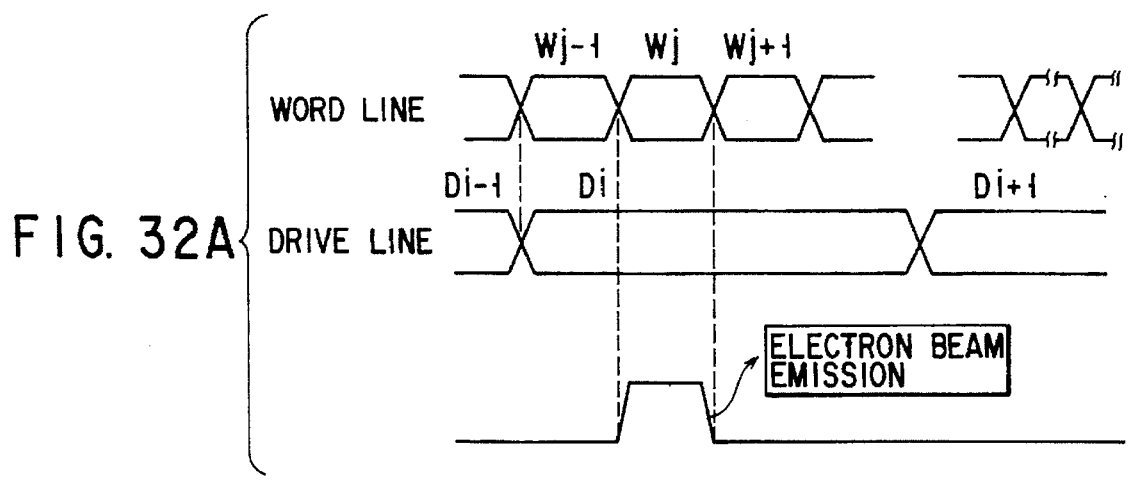
FIGS. 32A and 32B are timing charts showing, when different drive signals are used, relationships between an input signal and electron beam generation in the drive circuit shown in FIG. 31.
Figure 32B:
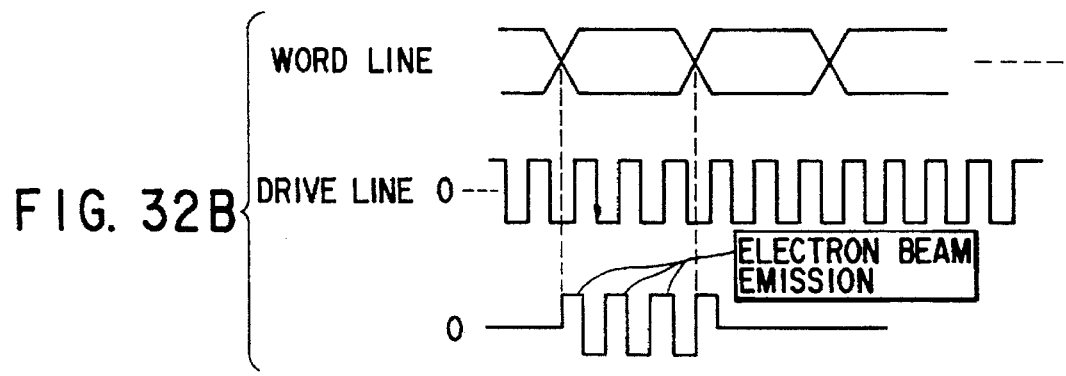

FIGS. 32A and 32B show the light-emitting scheme of the above apparatus. Note that FIGS. 32A and 32B show a case wherein different drive signals are generated by the drive circuit 601. As understood from FIGS. 32A and 32B, an electron beam is emitted from the electron beam generating apparatus 200 every time positive and negative signals are sent from the drive circuit 601. The electron emission amount (n) of the emitted electron beam is expressed by the following equation every switching operation:

$$n = 2\eta \cdot Pr \cdot Af \cdot 1/q$$

where $\eta$ is an efficiency, Pr is a polarization amount, Af is a light emission area, and q is a unit charge. In this case, no problem is posed when the light emission area Af is relatively large, i.e., several tens $\mu m^2$. When the light emission area is smaller than several tens $\mu m^2$, as shown in FIG. 32B, the number of emitting operations of the electron beam is increased by increasing the number of switching operations.

The drive signal is not limited to the drive signals having the waveforms shown in FIGS. 32A and 32B. For example, an AC wave or a triangular wave may be used as the drive signal.

According to the fourth to twelfth embodiments of the present invention, when a ferroelectric thin film and a semiconductor layer which covers at least a portion of the ferroelectric thin film are formed, an electron beam generating apparatus capable of efficiently generating an electron beam with low power consumption can be provided.

An electrical light-emitting surface light source element according to the thirteenth embodiment of the present invention will be described below with reference to FIGS. 33, 34A, and 34B.

Figure 33:
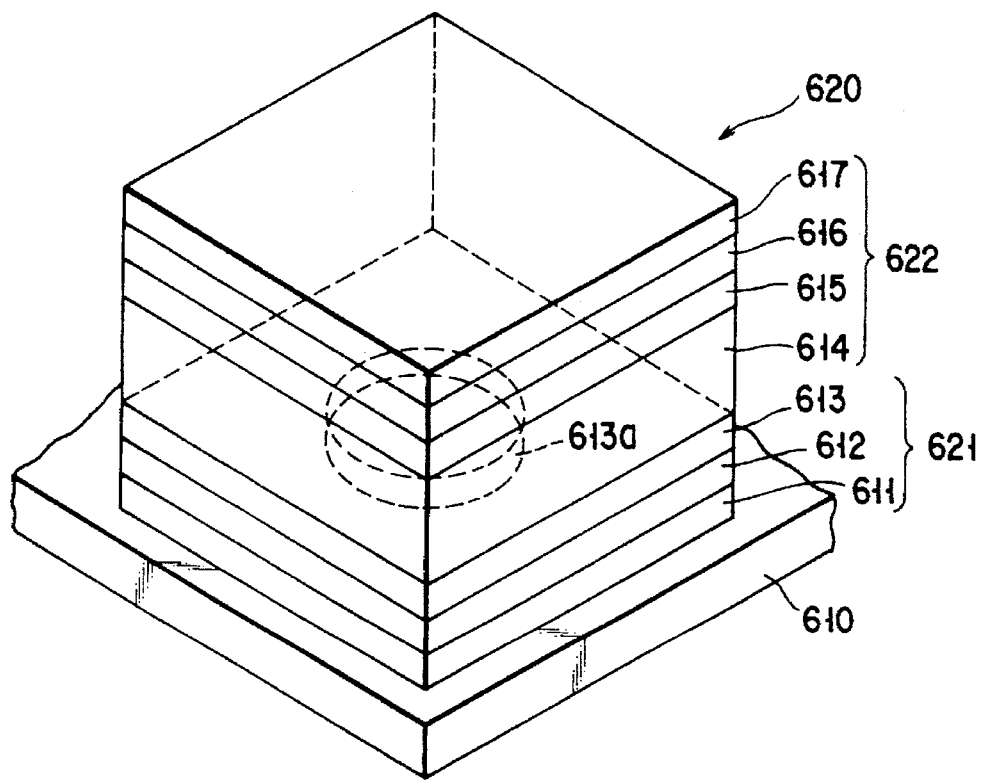
FIG. 33 is a perspective view showing an electrical light-emitting surface light source element according to the thirteenth embodiment of the present invention.
Figure 34A:
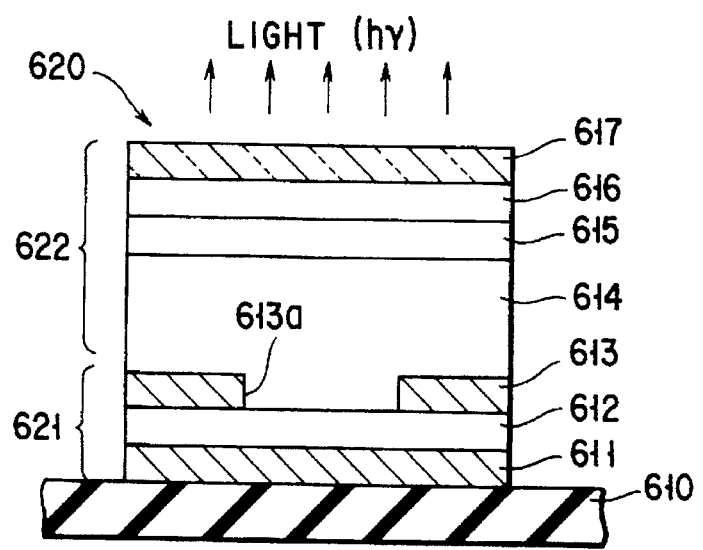
FIG. 34A is a sectional view showing the element shown in FIG. 33.

In FIGS. 33 and 34A, reference numeral 610 denotes a substrate of a display. A large number of electrical light-emitting surface light source elements 620 are arranged in a matrix form on the substrate (one of the electrical light-emitting surface light source elements 620 is representatively shown in FIGS. 33 and 34A). The substrate 610 is formed by an insulator, or an insulating film is formed on the substrate 610, thereby electrically separating the electrical light-emitting surface light source elements from each other. The electrical light-emitting surface light source element 620 has a lower electrode 611 directly formed on the substrate 610, a ferroelectric thin film 612 formed on the lower electrode 611, and a ferroelectric capacitor portion 621 constituted by an upper electrode 613 formed on the ferroelectric thin film 612. The thickness of the ferroelectric thin film 612 is very small, and preferably falls within a range of 50 nm to 2 $\mu m$. A circular opening 613a is formed at the central portion of the upper electrode 613, and a part of the upper surface of the ferroelectric thin film 612 is exposed in the opening. An electrical light-emitting portion 622 is formed on the capacitor portion 621. The electrical light-emitting portion 622 is constituted by a carrier acceleration layer 614 formed on the upper electrode 613 and having a lower central portion which is in contact with the ferroelectric thin film 612 through the opening 613a, a light-emitting layer 615, a block layer 616, and a transparent electrode 617 which are sequentially stacked on the carrier acceleration layer 614. The ferroelectric thin film 612 consists of a ferroelectric material having a voltage of about 3 to 4 eV, the carrier acceleration layer 614 and the block layer 616 consist of a compound semiconductor, and the light-emitting layer 615 consists of a compound semiconductor which has a band gap adjusted by a light emission wavelength or in which the same impurity as that in the light-emitting layer 615 is doped in accordance with a light emission process.

Figure 34B:
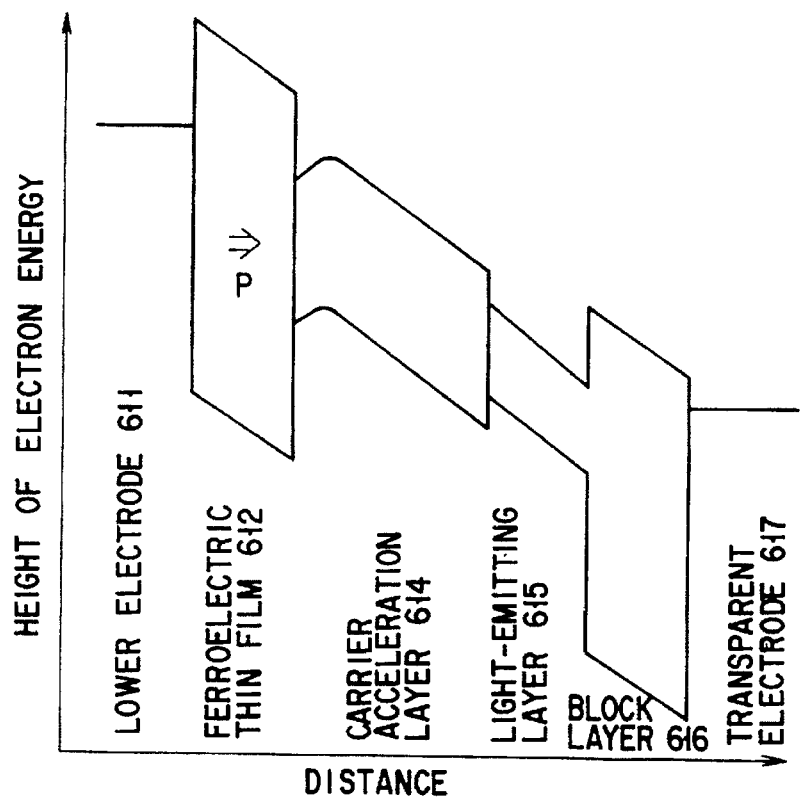
FIG. 34B is a diagram showing an electron energy of each layer of the element.

The electrical light-emitting surface light source element with the above arrangement has a distribution of heights of electron energy shown in FIG. 34B. That is, the ferroelectric thin film 612 has a highest electron energy, and the height of electron energy is decreased toward the block layer 616. In this embodiment, the dielectric constant of the ferroelectric thin film 612 is very large, i.e., 100 to 1,500. On the other hand, the dielectric constants of the carrier acceleration layer 614, the light-emitting layer 615, and block layer 616 are small, i.e., on the order of about 10. As a result, when a "−" voltage and a "+" voltage are applied to the lower electrode 611 and the transparent electrode 617, respectively, 90% of the voltage is applied to the carrier acceleration layer 614, the light-emitting layer 615, and the block layer 616.

The ferroelectric thin film 612 has spontaneous polarization P in its inside, and this polarization forms a domain in an electrode region by a crystal having a molecular arrangement facing in the same direction. When a voltage is applied to the ferroelectric thin film 612, the polarization P faces in the same direction to fix the domain. On the other hand, the electric flux density D obtained by the polarization P is expressed by the following equation when a dielectric constant and an electric field are represented by $\epsilon_0$ and $E_f$, respectively.

$$D = \epsilon_0 E_f + P$$

In this case, in order to stabilize the domain, an electric field $E_f$ must be sufficiently decreased in the ferroelectric thin film 612. For this purpose, excessive charges $\rho_0$ which compensate for the electric flux density D must be generated such that the following Gauss' law is satisfied.

$$\rho_0 = \int_s D \cdot dA$$

In general, the excessive charges are generated by free carriers in a metal electrode. Since the carrier acceleration layer 614 is formed by a semiconductor, a small number of carriers are present in the carrier acceleration layer 614. For this reason, since the excessive charges $\rho_0$ are generated in the carrier acceleration layer 614, the height of the energy band of the carrier acceleration layer 614 is considerably decreased as shown in FIG. 34B.

Thereafter, a voltage pulse applied across the lower electrode 611 and the upper electrode 613 is inverted to change the polarization P into a polarization −P. At this time, the excessive charges $\rho_0$ are changed from electrons to holes, and carriers which satisfy a condition of $\rho_0 - (-\rho_0) = 2\rho_0$ are generated.

Figure 35A:
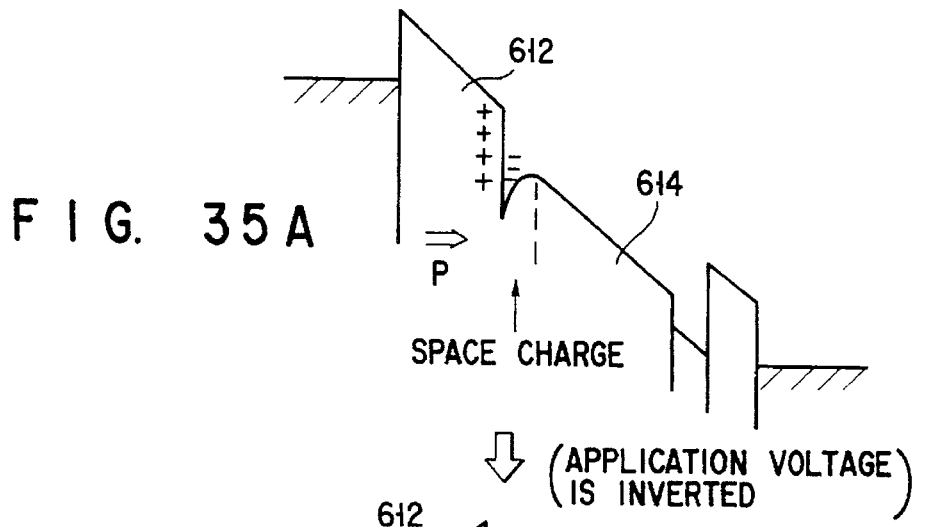
Figure 35B:
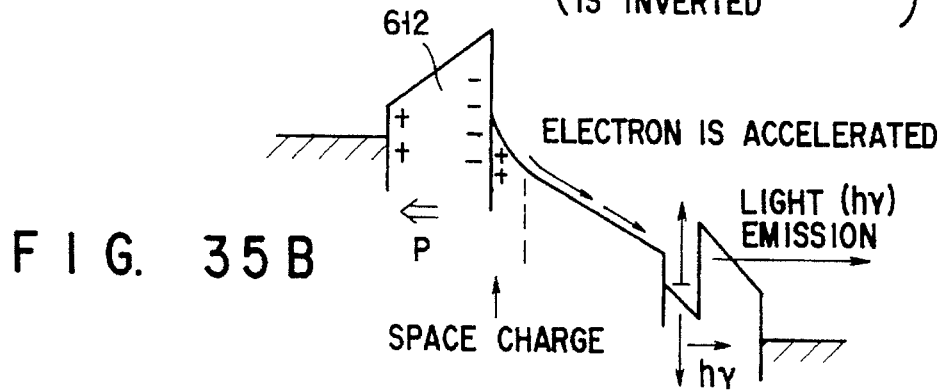

Assume that an amount of generated carriers is defined by $2\rho_0$ every time a polarity is reversed, the polarization P is given by $2\rho_0 = 2P$, and the carriers are completely compensated by the excessive charges $\rho_0$, i.e., assume that $E_f$ is set to be almost 0. In this case, the amount of charges is twice P, i.e., this amount corresponds to a switching charge $Q_{SW}$ ($=2\rho_0$). This switching charge $Q_{SW}$ is several tens $\mu C/cm^2$, and the current of the switching charge $Q_{SW}$ is several tens $KA/cm^2$. That is, these values are considerably large. The light emission process of the above carriers is shown in FIGS. 35A and 35B.

The carriers generated as described above are accelerated in the carrier acceleration layer 614 and injected into the light-emitting layer 615. The carrier acceleration layer 614 has a relatively small dielectric constant, and consists of a material which has a large band gap not to absorb the wavelength of light (hv) emitted from the light-emitting layer 615. It is preferable not to dope an impurity in the carrier acceleration layer 614 or to rarely dope an impurity in the carrier acceleration layer 614. In this case, the carrier acceleration layer 614 is set such that an acceleration of electrons is set to be several hundreds kV/cm to several tens MV/cm or more. In this acceleration, it does not matter whether multiplication of electrons occurs by multiple ionization scattering or the multiplication of electrons does not occur by the multiple ionization scattering.

In the light-emitting layer 615, light is emitted by: a direct transition process between accelerated and injected electrons and a band; or a transition process through a photon and a transition process performed at shallow and deep levels by an impurity, an excitation level obtained by carriers confined around an impurity, i.e., in a quantum well, or atomic ionization.

The block layer 616 is used to stop the flow of electrons at the light-emitting layer 615, to cause a reactive current to flow into the transparent electrode 617, and to confine light emitted from the light-emitting layer 615 using the block layer 616 so as to prevent the light from being absorbed in the transparent electrode 617.

Although the lower electrode 611 and the upper electrode 613 are not particularly limited, the lower and upper electrodes 611 and 613 can be constituted by a Pt layer or a combination between a Pt layer and a buffer layer. For example, the lower and upper electrodes 611 and 613 can consist of Pt/Ti, Pt/Ta, Pt/TiN, Pt/TiW, a noble metal such as Ag, Au, or Pd, or an Ni alloy, or a refractory metal such as Ni, Mo, W, Cr, TiN, TiW, or the like.

The ferroelectric thin film 612 can consist of a perovskite compound, a titanate-based compound such as $BaTiO_3$, $(Ba,Sr)TiO_3$, $SrTiO_3$, $PbTiO_3$ (PT), $Pb(Zr,Ti)O_3$ (PZT), or $(Pb,La)(ZrTi)O_3$, a niobate-based compound such as $Pb(Mg_{1/3},Nb_{2/3})O_3$, $LiNbO_3$, $LiTaO_3$, $KNbO_3$, $K(Ta,Nb)O_3$, a tungstenybronze-based compound such as $(Sv,Ba)Nb_2O_6$, $(Sv,Ba)_{0.8}RxNa_{0.4}Nb_2O_6$, $(Pb,BA)Nb_2O_6$, $(K,Sr)Nb_2O_6$, $(Pb,K)Nb_2O_6$, $Ba_2NaNb_5O_{15}PBN$, KSN, PKN, or BNN, or a Bi-based layered perovskite compound.

The carrier acceleration layer 614, the light-emitting layer 615, and the block layer 616 can consist of a compound semiconductor, more particularly, a material made on the basis of the material of the light-emitting layer. For example, these layers can consist of an ZnS-based, ZnSe-based, GaAs-based, GaAlAs-based, SiC-based, or ZnO-based compound, a-Si (amorphous silicon), a-Ge:H (hydrogen-containing amorphous germanium), $a\text{-}Si_{1-x}N_x\text{:}H$, $a\text{-}Si_{1-x}C_x\text{:}H$, $a\text{-}Si_{1-x}O_x$, an oxide based compound such as $Zn_2SiO_4$, $Zn_3(PO_4)_2$, Zw-xO, $Cd_{1-2}O$, $Zn_xCd_{1-2}O$, NiO, CoO, or $Cu_2O$, or a chalcopyrite-based compound such as $CuCaS_2$, $CuAlSe_2$, $CuAlS_2$, $AgGaS_2$, or ZnCdS. In addition, the above layers can be formed by a group I-III-V2 chalcopyrite-based compound, the above materials set in monocrystalline, fine-crystal, and amorphous states, or other materials.

The transparent electrode 617 is formed by ITO or the like.

A display apparatus obtained when electrical light-emitting surface light source elements each having the above arrangement are arranged in a matrix form to form pixels will be described below with reference to FIGS. 36A and 36B. FIG. 36A is a sectional view representatively showing the structure of one of combinations of n-MOS transistors serving as active elements and electrical light-emitting surface light source elements, and FIG. 36B is an equivalent circuit diagram of the structure.

In FIG. 36A, reference numeral 630 denotes a p-type silicon substrate. A large number of electrical light-emitting surface light source elements 620 arranged in a matrix form and n-MOS transistors 631 arranged in correspondence with the electrical light-emitting surface light source elements 620 are formed on the silicon substrate 630. The upper surface of the silicon substrate 630 except for portions on which the transistors 631 are formed is covered with a field oxide film 632, and a phosphorus glass film serving as the insulating substrate 610 is formed on the oxide film 632. The lower electrodes 611 are formed on the phosphorus glass film, and an insulating film 633 is formed to electrically insulate the lower electrodes 611 from each other.

On the other hand, n-type source and drain regions 634 and 635 are formed on the exposed upper surface of the silicon substrate 630. Gate electrodes 636 are formed on the channel between these regions through a gate insulating film. In addition, the drain region 635 is electrically connected to the upper electrode 613 by a drain electrode 637.

In this example, after the drain electrode 637 is patterned and formed such that the drain region 635 is connected to the upper electrode 613, the carrier acceleration layer 614 is formed on the resultant structure by, e.g., CVD of Mo.

The gate and source electrodes of each of the transistors 631 are connected to an address circuit 638 and a drive circuit 639, respectively, as shown in FIG. 36B.

In the display apparatus with the above arrangement, the transistors 631 are selectively switched in accordance with a drive signal on the basis of image information from the address circuit 638 and the drive circuit 639 so as to drive electrical light-emitting surface light source elements, thereby outputting a predetermined image.

Figure 37A:
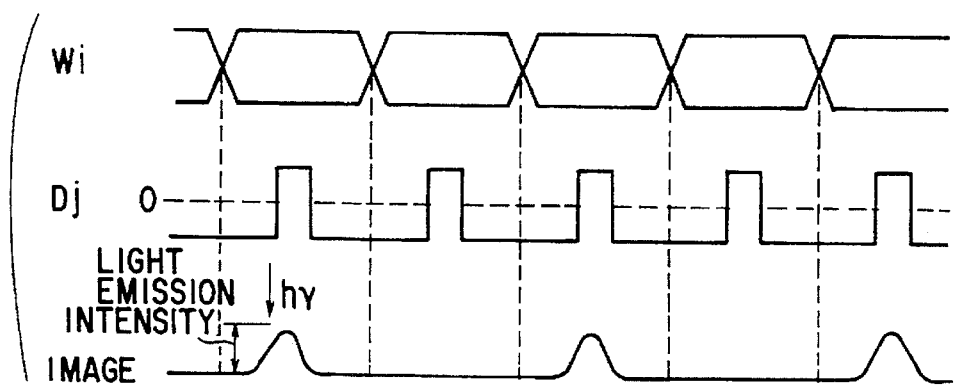
Figure 37B:
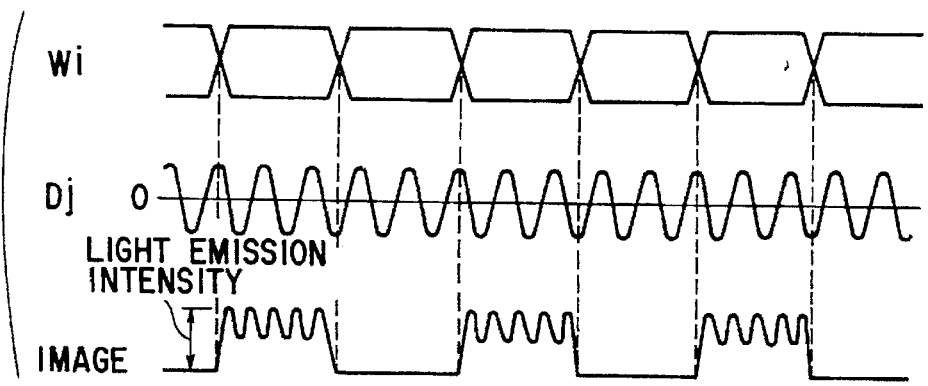

FIGS. 37A and 37B show the light emission scheme of this apparatus. In FIGS. 37A and 37B, reference symbol Wi denotes a signal supplied from the address circuit 638 to an address line, and reference symbol Dj denotes a signal supplied from the drive circuit 639 to a drive line. FIG. 37A shows a case wherein the drive signal (Dj) is a pulse signal. In this case, a pixel (ij) performs single light emission. FIG. 37B shows a case wherein the drive signal (Dj) is a sine waveform signal. In this case, gradation for adjusting a light emission amount may be determined in accordance with the number of pulses of the drive signal.

Figure 38:
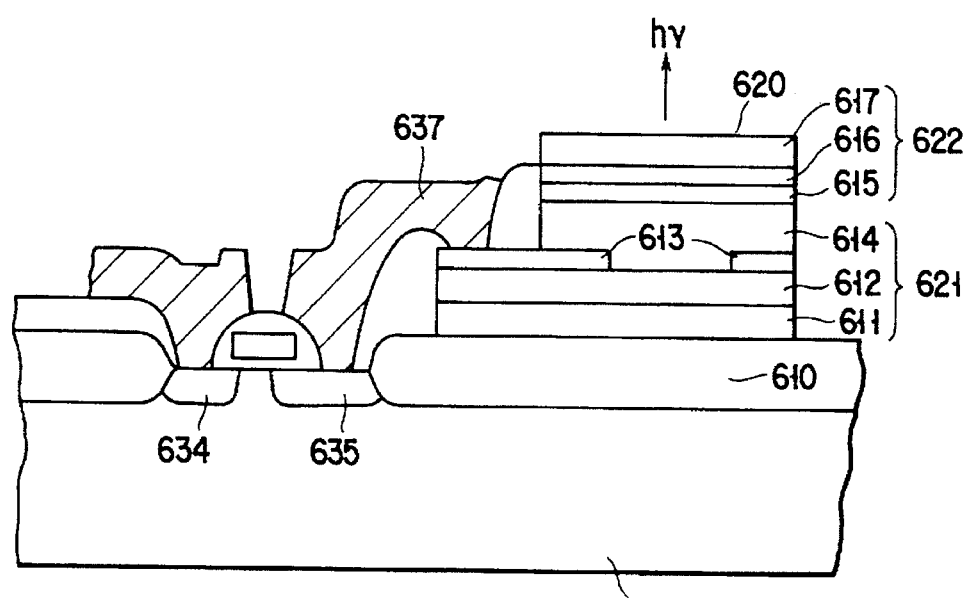
FIG. 38 is a sectional view showing a modification of the display shown in FIG. 36A.

FIG. 38 shows a modification of the apparatus shown in FIG. 36A.

In this apparatus, after electrical light-emitting surface light source elements 620 are formed on a silicon substrate 630, a part of an electrical light-emitting portion 622 is removed using ion milling or a reactive ion etching technique to expose a part of an upper electrode 613, and a drain electrode 637 is formed.

Other modifications will be sequentially described below with reference to the accompanying drawings. The same reference numerals as in the above embodiments denote the same parts in these modifications, and a description thereof will be omitted.

An electrical light-emitting surface light source element shown in FIG. 39A has a semiconductor layer 640 formed at a contact interface between a ferroelectric thin film 612 and a carrier acceleration layer 614 in an opening 613a of an upper electrode 613. The semiconductor layer 640 preferably has a thickness of 5 nm to 100 nm, and may be formed on the ferroelectric thin film 612 by heating the surface of the ferroelectric thin film 612 or by depositing a semiconductor on the surface of the ferroelectric thin film 612. For example, when the opening 613a is formed by ion milling in the upper electrode 613 deposited on the ferroelectric thin film 612, the surface of the ferroelectric thin film 612 is slightly etched. For this reason, when the etched surface is annealed in, e.g., an oxygen atmosphere, the n-type semiconductor layer 640 can be formed on the surface of the ferroelectric thin film 612. When the semiconductor layer 640 is formed, an electron energy is increased between the ferroelectric thin film 612 and the carrier acceleration layer 614 as shown in FIG. 39B, and an effect of increasing generation efficiency of the carriers, i.e. electrons can be obtained.

In an electrical light-emitting surface light source element shown in FIGS. 40A and 40B, a transparent electrode 617 is directly formed on a light-emitting layer 615 without using the block layer 616 which is formed between the light-emitting layer 615 and the transparent electrode 617 in each of the above embodiments because of the following reason. That is, when light emission is performed by interatomic transition, a blocking function is satisfactorily obtained by a block step formed by a heterojunction at the interface between a carrier acceleration layer 614 and the light-emitting layer 615.

Figure 41A:
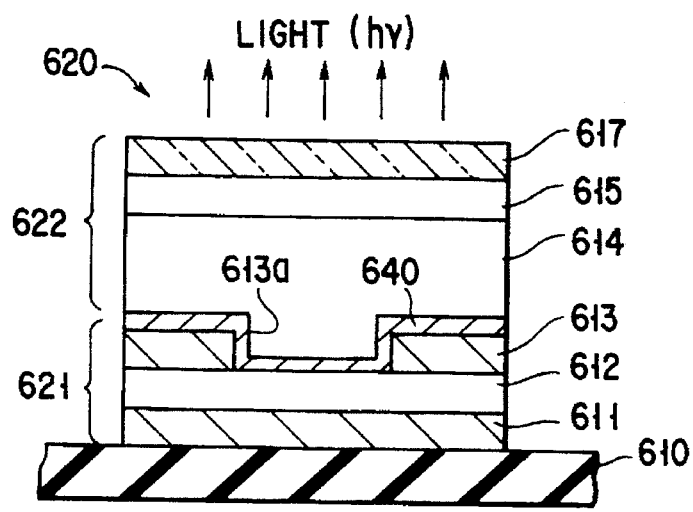
FIG. 41A is a sectional view showing an electrical light-emitting surface light source element according to still another modification of the present invention.
Figure 41B:
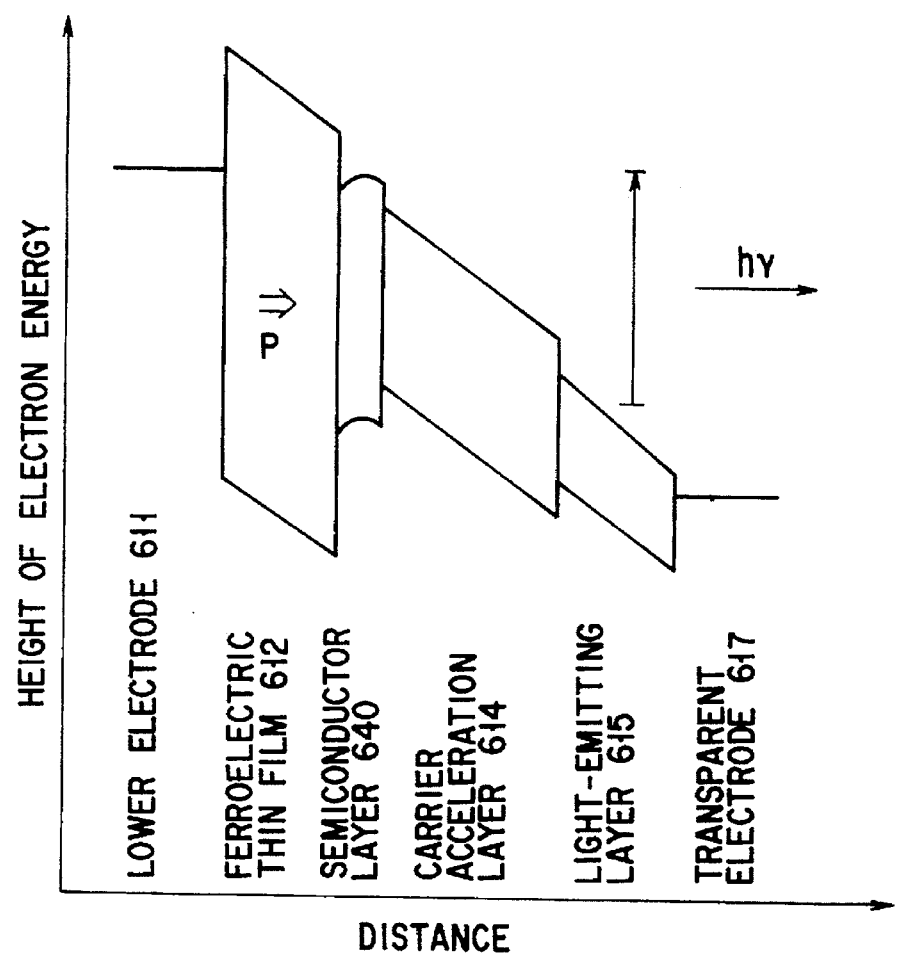
FIG. 41B is a diagram showing electron energy of each layer of the element in FIG. 41A.

In an electrical light-emitting surface light source element shown in FIGS. 41A and 41B, as in the element shown in FIGS. 40A and 40B, a block layer 616 is not used, a semiconductor layer 640 is formed in a heterojunction state at the interfaces between a ferroelectric thin film 612, an upper electrode 613, and the carrier acceleration layer 614. In this modification, the block layer need not be arranged, and a luminous efficacy can be increased. The semiconductor layer 640 can be formed at only the interface between the ferroelectric thin film 612 and the carrier acceleration layer 614, as a matter of course.

According to the thirteenth and fourteenth embodiments and the several modifications of these embodiments, when EL light emission is obtained by electron injection performed by the polarization reversal of a ferroelectric material, an electrical light-emitting surface light source element which does not require an auxiliary light source such as a back light, has a wide field angle and excellent time response, and can be driven by a low voltage can be provided.

An electrical light-emitting surface light source element according to the fifteenth embodiment of the present invention will be described below with reference to FIGS. 42, 43A, and 43B.

In FIGS. 42 and 43A, reference numeral 710 denotes a substrate for display. A large number of electrical light-emitting surface light source elements 720 are arranged in a matrix form (only one of the electrical light-emitting surface light source elements 720 is representatively shown in FIGS. 42 and 43A). The substrate 710 consists of an insulator, or an insulating film is formed on the upper surface of the substrate 710 to electrically separate the electrical light-emitting surface light source elements from each other. Each of the electrical light-emitting surface light source elements 720 has a ferroelectric capacitor portion 721 constituted by a lower electrode 711 directly formed on the substrate 710, a ferroelectric thin film 712 formed on the lower electrode 711, and a upper electrode 713 formed on the ferroelectric thin film 712. The thickness of the ferroelectric thin film 712 is very small, and preferably falls within a range of 50 nm to 2 µm. A circular opening 713a is formed in the central portion of the upper electrode 713, and the upper surface of the ferroelectric thin film 712 is exposed in the opening. An electrical light-emitting portion 722 is formed on the ferroelectric capacitor portion 721. The electrical light-emitting portion 722 is constituted by a carrier multiplication layer 714 formed on the upper electrode 713 and having a central upper portion which is in contact with the ferroelectric thin film 712 thorough the opening 713a, a light-emitting layer 715, and a transparent electrode 717. The light-emitting layer 715 and the transparent electrode 717 are sequentially formed on the carrier multiplication layer 714. The ferroelectric thin film 712 consists of a ferroelectric material, the carrier multiplication layer 714 consists of a compound semiconductor, the light-emitting layer 715 consists of a compound semiconductor which has a band gap adjusted by a light emission wavelength or in which the same impurity as that in the light-emitting layer 715 is doped in accordance with a light emission process.

The electrical light-emitting surface light source element with the above arrangement has a distribution of heights of electron energy shown in FIG. 43B. That is, the ferroelectric thin film 712 has a highest electron energy, and the height of electron energy is decreased toward the light-emitting layer 715. In this embodiment, the dielectric constant of the ferroelectric thin film 712 is very large, i.e., 100 to 1,500. On the other hand, the dielectric constants of the carrier acceleration layer 714 and the light-emitting layer 715 are small, i.e., on the order of about 10. As a result, when a "−" voltage and a "+" voltage are applied to the lower electrode 711 and the transparent electrode 717, respectively, 90% of the voltage is applied to the carrier acceleration layer 714 and the light-emitting layer 715.

The ferroelectric thin film 712 has spontaneous polarization P in its inside, and this polarization forms a domain in an electrode region by a crystal having a molecular arrangement facing in the same direction. When a voltage is applied to the ferroelectric thin film 712, the polarization P faces in the same direction to fix the domain. On the other hand, the electric flux density D obtained by the polarization P is expressed by the following equation when a dielectric constant and an electric field are represented by $\epsilon_0$ and $E_f$, respectively.

$$D = \epsilon_0 E_f + P$$

In this case, in order to stabilize the domain, an electric field $E_f$ must be sufficiently decreased in the ferroelectric thin film 712. For this purpose, excessive charges $\rho_0$ which compensate for the electric flux density D must be generated such that the following Gauss' law is satisfied.

$$\rho_0 = \int_s D \cdot dA$$

In general, the excessive charges are generated by free carriers in a metal electrode. Since the carrier multiplication layer 714 is formed by a semiconductor, a small number of carriers are present in the carrier multiplication layer 714. For this reason, since the excessive charges $\rho_0$ are generated in the carrier multiplication layer 714, the height of the energy band of the carrier multiplication layer 714 is considerably decreased as shown in FIG. 44B.

Thereafter, a voltage pulse applied across the lower electrode 711 and the upper electrode 713 is inverted to change the polarization P into a polarization −P. At this time, the excessive charges $\rho_0$ are changed from electrons to holes, and carriers which satisfy a condition of $\rho_0 - (-\rho_0) = 2\rho_0$ are generated.

Assume that an amount of generated carriers is defined by $2\rho_0$ every time a polarity is reversed, the polarization P is given by $2\rho_0 = 2P$, and the carriers are completely compensated by the excessive charges $\rho_0$, i.e., assume that the electric field $E_f$ is set to be almost 0. In this case, the amount of charges is twice P, i.e., this amount corresponds to a switching charge $Q_{SW}$ ($=2\rho_0$). This switching charge QSW is several tens µC/cm$^2$, and the current of the switching charge QSW is several tens KA/cm$^2$. That is, these values are considerably large. The light emission process of the above carriers is shown in FIGS. 44A and 44B.

The carriers generated as described above are accelerated in the carrier multiplication layer 714 and injected into the light-emitting layer 715. The carrier multiplication layer 714 has a relatively small dielectric constant, and consists of a material which has a large band gap not to absorb the wavelength of light (hv) emitted from the light-emitting layer 715. It is preferable not to dope an impurity in the carrier multiplication layer 714 or to rarely dope an impurity in the carrier multiplication layer 714. In this case, the carrier multiplication layer 714 is set such that an acceleration of electrons is set to be several hundreds kV/cm to several tens MV/cm or more. In this acceleration, it does not matter whether multiplication of electrons occurs by multiple ionization scattering or the multiplication of electrons does not occur by the multiple ionization scattering.

In the light-emitting layer 715, light is emitted by: a direct transition process between accelerated and injected electrons and a band; or a transition process through a photon, a transition process performed at shallow and deep levels by an impurity, an excitation level obtained by carriers confined around an impurity, i.e., in a quantum well, or ionization in atoms. The above light emission mechanism is shown in FIG. 44A. According to the current-voltage characteristics of the light emission mechanism, as shown in FIG. 44B, an application voltage becomes higher than a predetermined voltage, multiplication of electrons is abruptly performed in the carrier multiplication layer 714.

Although the lower electrode 711 and the upper electrode 713 are not particularly limited, the lower and upper electrodes 711 and 713 can be constituted by a Pt layer or a combination between a Pt layer and a buffer layer. For example, the lower and upper electrodes 711 and 713 can consist of Pt/Ti, Pt/Ta, Pt/TiN, Pt/TiW, a noble metal such as Ag, Au, or Pd, or an Ni alloy, or a refractory metal such as Ni, Mo, W, Cr, TiN, TiW or the like.

The ferroelectric thin film 712 can consist of a perovskite compound, a titanate-based compound such as $BaTiO_3$, $(Ba,Sr)TiO_3$, $SrTiO_3$, $PbTiO_3$ (PT), $Pb(Zr,Ti)O_3$ (PZT), or $(Pb,La)(Zr Ti)O_3$, a niobate-based compound such as $Pb(Mg_{1/3},Nb_{2/3})O_3$, $LiNbO_3$, $LiTaO_3$, $KNbO_3$, $K(Ta,Nb)O_3$, a tungstenybronze-based compound such as $(Sv,Ba)Nb_2O_6$, $(Sv,Ba)_{0.8}RxNa_{0.4}Nb_2O_6$, $(Pb,BA)Nb_2O_6$, $(K,Sr)Nb_2O_6$, $(Pb,K)Nb_2O_6$, $Ba_2NaNb_5O_{15}PBN$, KSN, PKN, or BNN, or a Bi-based layered perovskite compound.

The carrier multiplication layer 714 and the light-emitting layer 715 can consist of a compound semiconductor, more particularly, a material made on the basis of the material of the light-emitting layer. For example, these layers can consist of an ZnS-based, ZnSe-based, GaAs-based, GaAlAs-based, SiC-based, or ZnO-based compound, a-Si (amophous silicon), a-Ge:H (hydrogen-containing amorphous germanium), $a\text{-}Si_{1-x}N_x:H$, $a\text{-}Si_{1-x}C_x:H$, $a\text{-}Si_{1-x}O_x$, an oxide based compound such as $Zn_2SiO_4$, $Zn_3(PO_4)_2$, $Z_{w-x}O$, $Cd_{1-2}O$, $Zn_xCd_{1-2}O$, NiO, CoO, or $Cu_2O$, or a chalcopyrite-based compound such as $CuCaS_2$, $CuAlSe_2$, $CuAlS_2$, $AgGaS_2$, or ZnCdS. In addition, the above layers can be formed by a group I-III-V2 chalcopyrite-based compound, the above materials set in monocrystalline, fine-crystal, and amorphous states, or other materials.

The transparent electrode 717 is formed by ITO or the like.

The sixteenth embodiment will be described below with reference to FIGS. 45A and 45B.

In this embodiment, a grid layer 716 is formed in an carrier multiplication layer 714, and the carrier multiplication layer 714 is divided into upper and lower layers. The grid layer 716 is formed by a conductive layer having an opening 716a in its central portion, and the grid layer 716 can control an acceleration electric field such that electrons moved from the lower layer to the upper layer are controlled at the opening.

A display apparatus obtained when the electrical light-emitting surface light source elements each of which is shown in FIG. 43 are arranged in a matrix form to form pixels will be described below with reference to FIG. 46.

Figure 46:
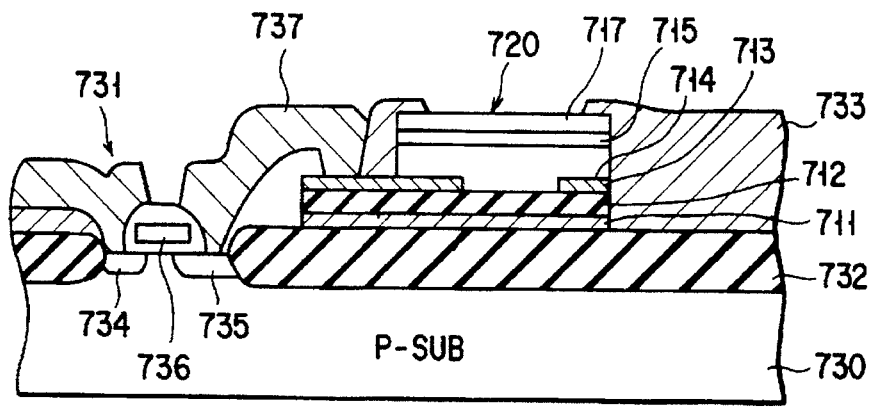
FIG. 46 is a sectional view showing a part of a display obtained by combining the electrical light-emitting surface light source element in FIG. 43A with a MOS transistor.

In FIG. 46, reference numeral 730 denotes a p-type silicon substrate, a large number of electrical light-emitting surface light source elements 720 arranged in a matrix form and n-MOS transistors 731 arranged in correspondence with the electrical light-emitting surface light source elements 720 are formed on the silicon substrate 730. The upper surface of the silicon substrate 730 except for portions on which the transistors 731 are formed is covered with a field oxide film 732, and the oxide film 732 and the silicon substrate 730 constitute the substrate 710. Lower electrodes 711 are formed on the oxide film 732, and an insulating film 733 is formed to electrically insulate the lower electrodes 711.

On the other hand, n-type source and drain regions 734 and 735 are formed on the exposed upper surface of the silicon substrate 730. Gate electrodes 736 are formed on the channel between these regions through a gate insulating film. In addition, the drain region 735 is electrically connected to the upper electrode 713 by a drain electrode 737.

In this embodiment, the electrical light-emitting surface light source element 720 is formed after the source region 734, the drain region 735, and the gate electrode 736 are formed on the silicon substrate 730, and the insulating film 733 is formed. Thereafter, a contact hole is formed in a portion of the insulating film 733 located on the upper electrode 713, the drain electrode 737 is deposited and patterned, so that the upper electrode 713 is electrically connected to the drain region 735.

Figure 47A:
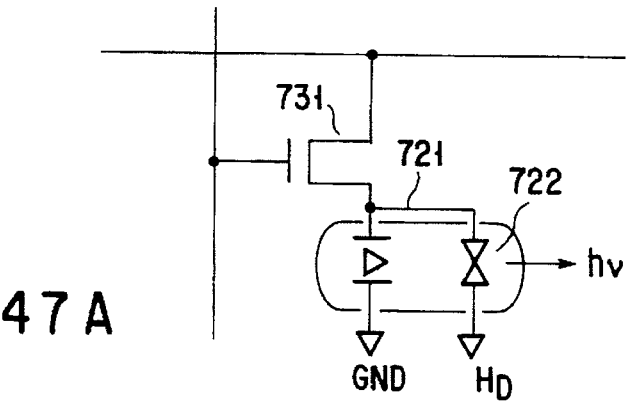
FIGS. 47A, 47B, and 47C are views for explaining different drive systems of the electrical light-emitting surface light source element.
Figure 47B:
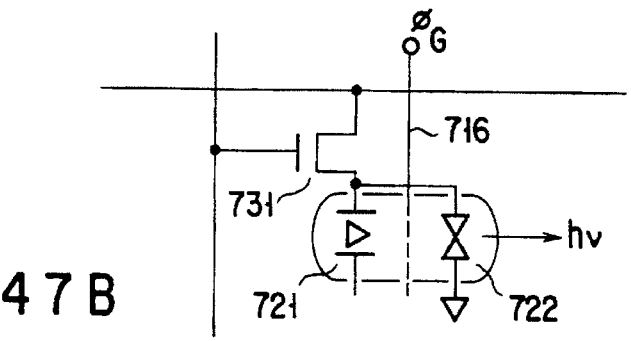
Figure 47C:
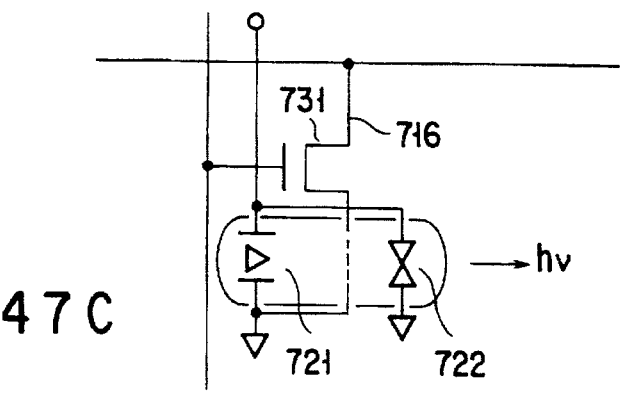

FIGS. 47A, 47B, and 47C show a driving scheme obtained when the electrical light-emitting surface light source element of the present invention is combined with a MOS transistor serving as an active element.

In FIG. 47A, the electrical light-emitting surface light source element shown in FIG. 43A is used, a voltage is always applied across the capacitor portion 721 and the light-emitting portion 722 from a word line through the transistor 731, and the electrical light-emitting surface light source element is selectively driven in accordance with a signal supplied from a drive line to the transistor 731 so as to emit light.

In FIG. 47B, the electrical light-emitting surface light source element shown in FIG. 45A is used, only the voltage of the grid layer 716 is externally controlled by the entire display apparatus.

In FIG. 47C, the electrical light-emitting surface light source element shown in FIG. 45A is used, the grid layer 716 is connected to the drain electrode of the transistor 731, and a voltage is always applied to the capacitor portion 721. Therefore, the grid layer 716 is driven by the transistor 731.

FIGS. 48A and 48B show an arrangement of the electrical light-emitting surface light source elements of the present invention which are used in a color display apparatus.

In FIG. 48A, an electrical light-emitting surface light source element 720R for emitting a red beam (R), an electrical light-emitting surface light source element 720G for emitting a green beam (G), and an electrical light-emitting surface light source element 720B for emitting a blue beam (B) are provided, and address circuits 754 and 755 cause the electrical light-emitting surface light source elements to independently emit the beams through the corresponding MOS transistors 731.

In FIG. 48B, only three electrical light-emitting surface light source elements 720 for emitting white beams are provided, three primary color filters are arranged on the emission sides of the electrical light-emitting surface light source elements 720, and the emitted white beams are respectively colored using the primary color filters.

In the embodiments shown in FIGS. 43A and 45A, although the ferroelectric thin film 712 is directly connected to the upper electrode 713, a semiconductor layer may be formed at the interface between the ferroelectric thin film 712 and the upper electrode 713. This case will be described below with reference to FIGS. 49A, 49B, and 49C.

FIG. 49A shows a case wherein the semiconductor layer 740 which is formed on an exposed surface when the ferroelectric thin film 712 is annealed is left. In this case, after the semiconductor layer 740 is formed, the upper electrode 713 is formed, and the opening 713a is formed by etching such as lift-off or wet etching.

FIG. 49B shows a case wherein, after the upper electrode 713 is formed on the ferroelectric thin film 712, the semiconductor layer 740 is formed from the opening 713a on the exposed surface. In this case, after the opening 713a is formed by reactive ion etching, sputter etching, ion milling or the like, the resultant structure is annealed again to form the semiconductor layer 740.

In FIG. 50C, the upper electrode 713 is formed on the ferroelectric thin film 712, the opening 713a is formed, and then a semiconductor material is deposited on the ferroelectric thin film 712 and the upper electrode 713 so as to form the semiconductor layer 740.

A modification of the electrical light-emitting portion 722 will be described below with reference to FIGS. 50A and 50B.

FIG. 50A shows a case wherein a block layer 742 is interposed between a carrier multiplication layer 714 and a transparent electrode 717. The block layer 742 has $\Delta n$ and/or a band gap larger than $\Delta n$ and/or a band gap of a light-emitting layer 715 to reduce a reactive current or confine the reactive current. The block layer 742 consists of a compound semiconductor or the like.

FIG. 50B shows a case wherein a carrier relaxation layer 743 is interposed between an upper electrode 713 and a carrier multiplication layer 714. When electrons having high energy are directly injected in the carrier multiplication layer 714 at a high concentration, the carrier multiplication layer 714 may be degraded by impact ionization. For this reason, the carrier relaxation layer 743 is interposed between the upper electrode 713 and the carrier multiplication layer 714 to prevent degradation of the carrier multiplication layer 714. As in the block layer 742, the carrier relaxation layer 743 has $\Delta n$ and/or a band gap larger than $\Delta n$ and/or a band gap of the light-emitting layer 715. Even when the carrier relaxation layer 743 has a band gap equal to that of the light-emitting layer 715, the carrier relaxation layer 743 preferably consists of a material in which an impurity is not doped.

In each of the above embodiments, the carrier multiplication layer 714 may be formed by a single layer consisting of one material, or may be formed by a multilayered structure consisting of a plurality of materials. For example, the multilayered structure may be formed in the following manner. That is, a lower layer is formed by deposition, a monocrystalline upper layer consisting of the same material as that of the lower layer or a material different from that of the lower layer is formed on the lower layer.

According to the fifteenth and sixteenth embodiments of the present invention and the modifications of the fifteenth and sixteenth embodiments, EL light emission is obtained by electron injection caused by polarization reversal of a ferroelectric material, thereby providing an electrical light-emitting surface light source element which does not require an auxiliary light source such as a back light, has a wide field angle and excellent time response, and can be driven by a low voltage.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An image display apparatus comprising:
   a semiconductor substrate;
   a plurality of electrical light-emitting surface light source elements arranged in a matrix form on said semiconductor substrate, said plurality of electrical light-emitting surface light source elements each having a ferroelectric capacitor portion and an electrical light-emitting portion, said ferroelectric capacitor portion having a lower electrode formed on said semiconductor substrate, a ferroelectric thin film formed on said lower electrode, and an upper electrode formed on said ferroelectric thin film with an electron emission hole, and said electrical light-emitting portion having a carrier acceleration/multiplication layer formed on said upper electrode by a semiconductor layer, a light-emitting layer formed on said carrier acceleration/multiplication layer, and a transparent electrode formed on said light-emitting layer; and
   a plurality of switching elements formed on said semiconductor substrate in correspondence with said plurality of electrical light-emitting surface light source elements;
   wherein a voltage applied across said upper and lower electrodes of said ferroelectric capacitor portion of a corresponding one of said plurality of electrical light-emitting surface light source elements in accordance with a drive signal selectively supplied to said plurality of switching elements is inverted, so that electrons emitted from said electron emission hole of said upper electrode by polarization reversal generated in said ferroelectric thin film are injected in the light-emitting portion through said carrier acceleration/multiplication layer of said electrical light-emitting portion to cause said light-emitting portion to selectively emit light, thereby guiding visible light to an outside of said image display apparatus through said transparent electrode.

2. An apparatus according to claim 1, further comprising:
   a block layer, formed between said light-emitting layer and said transparent electrode, for stopping a flow of electrons from said carrier acceleration/multiplication layer at said light-emitting layer.

3. An apparatus according to claim 1, wherein when said plurality of switching elements comprise MOS transistors, and a drain region of each of said MOS transistors is electrically connected to said upper electrode of a corresponding one of said ferroelectric capacitor portions.

4. An apparatus according to claim 1, further comprising:
   a semiconductor layer formed at a contact interface between said ferroelectric thin film and said carrier acceleration/multiplication layer in said electron emission hole of said upper electrode.

5. An apparatus according to claim 1, further comprising:
   semiconductor layers formed at contact interfaces between said ferroelectric thin film, said upper electrode, and said carrier acceleration/multiplication layer in a heterojunction state.

6. An apparatus according to claim 1, further comprising:
   a grid layer having an electron through hole and formed by a conductive layer in said carrier acceleration/multiplication layer.

7. An apparatus according to claim 1, further comprising:
   a carrier relaxation layer formed between said upper electrode and said carrier acceleration/multiplication layer.

8. An electrical light-emitting surface light source element comprising:
   a lower electrode;
   a ferroelectric thin film formed on said lower electrode, for emitting electrons serving as bound charges through utilization of a local high electric field caused by polarization reversal;
   an upper electrode having an opening therein, and said upper electrode being formed on said ferroelectric thin film;
   an electron-multiplying layer, formed on said upper electrode, and said electron-multiplying layer having a part which is in contact with said ferroelectric thin film through said opening of said upper electrode, for multiplying electrons supplied from said ferroelectric thin film using an electron avalanche phenomenon; and
   an electrical light-emitting layer, formed on said electron-multiplying layer, for emitting light by injection of the multiplied electrons.

9. An image display apparatus comprising:
   a semiconductor substrate;
   a plurality of ferroelectric electron beam generating elements arranged in a matrix form on said semiconductor substrate, said plurality of ferroelectric electron beam generating elements each having a lower electrode formed on said semiconductor substrate, a ferroelectric thin film formed on said lower electrode, and an upper electrode having an electron emission hole and formed on said ferroelectric thin film;
   a plurality of switching elements formed on said semiconductor substrate in correspondence with said plurality of ferroelectric electron beam generating elements; and
   a screen arranged such that a phosphor-coated surface of said screen is opposite to said upper electrodes of said plurality of ferroelectric electron beam generating elements arranged in a matrix form on said semiconductor substrate,
   wherein a voltage applied across said upper and lower electrodes of said ferroelectric capacitor portion of a corresponding one of said plurality of ferroelectric electron beam generating elements in accordance with a drive signal selectively supplied to said plurality of switching elements is inverted, so that an electron beam emitted from said electron emission hole of said upper electrode by polarization reversal generated in said ferroelectric thin film is radiated on the phosphor-coated surface of said screen, thereby guiding spontaneously emitted visible light to the surface of said screen.

10. An apparatus according to claim 9, wherein said upper electrode includes first and second upper electrodes in which electron emission holes are respectively formed.

11. An apparatus according to claim 9, wherein said plurality of switching elements comprise MOS transistors, and drain region of each of said MOS transistors is electrically connected to said upper electrode of a corresponding one of said ferroelectric electron beam generating elements.

12. An apparatus according to claim 10, wherein said plurality of switching elements comprise MOS transistors, a drain region of each of said MOS transistors is electrically connected to said first upper electrode of a corresponding one of said ferroelectric electron beam generating elements, and said second upper electrode is connected to an inverting circuit for detecting the polarization reversal.

13. An apparatus according to claim 9, wherein said ferroelectric electron beam generating element further includes:

a semiconductor layer formed between said ferroelectric thin film and said upper electrode to stably bias the polarization reversal in said ferroelectric thin film.

14. An apparatus according to claim 13, wherein said semiconductor layer includes a semiconductor layer spontaneously formed when said ferroelectric thin film is annealed.

15. An apparatus according to claim 13, wherein a channel for regulating diffusion of the electrons in a lateral direction is formed on said semiconductor layer and said ferroelectric thin film.

16. An apparatus according to claim 13, wherein a projection portion for concentrating the electrons is formed on said semiconductor layer.

17. An apparatus according to claim 13, wherein said ferroelectric electron beam generating element further includes a dielectric layer formed in a dome-like form on said upper electrode and an auxiliary electrode to accelerate the electron beam.

18. An electron beam generating device comprising:

a lower electrode;

an upper electrode;

a ferroelectric thin film sandwiched between and electrically connected with said lower electrode and said upper electrode for emitting electrons through utilization of a local high electric field caused by polarization reversal, the thickness of said ferroelectric thin film being within the range from 50 nm to 2 µm;

said upper electrode having an opening therein; and a semiconductor layer formed directly on the ferroelectric thin film, the semiconductor layer being located in the opening of said upper electrode.

19. An electron beam generating device according to claim 18, further comprising a carrier acceleration layer formed on the semiconductor layer for accelerating carriers emitted from the semiconductor.

20. An electron beam generating device according to claim 18, wherein a channel for regulating diffusion of the electrons in a lateral direction is formed on said semiconductor layer and said ferroelectric thin film.

21. An electron beam generating device according to claim 18, wherein a projection for concentrating the electrons is formed on said semiconductor layer.

22. An electron beam generating device according to claim 18, further comprising:

a dielectric layer with an opening formed on the upper electrode, the opening of the dielectric layer having a portion where a cross section of the opening in the dielectric layer along a direction perpendicular to a direction of the electron emission being larger than that of the opening of the upper electrode; and an auxiliary electrode formed on the dielectric layer for accelerating the electron beam.

* * * * *